US012574345B2

(12) United States Patent
Dorman et al.

(10) Patent No.: US 12,574,345 B2
(45) Date of Patent: Mar. 10, 2026

(54) GENERATING AND PROVIDING ORGANIZATION-BASED SPACES FOR A VIRTUAL COMMUNITY OF USERS

(71) Applicant: Meta Platforms, Inc., Menlo Park, CA (US)

(72) Inventors: Charmaine Hung Dorman, San Francisco, CA (US); Jessie Kim, Oakland, CA (US); Ka Man Lei, Belmont, CA (US); Christopher Jing-ming Su, San Francisco, CA (US); Jaleh Afshar, Menlo Park, CA (US); Nathanael Arthur Wells Clinton, Menlo Park, CA (US); Richmond Watkins, San Francisco, CA (US); Bob Baldwin, San Francisco, CA (US); Monica Ares, Burlingame, CA (US); Daniel Ilic, Palo Alto, CA (US); Mallory Taylor, Menlo Park, CA (US); Euzcil Castaneto, Menlo Park, CA (US); Lauren Kostka, Oakland, WA (US); Timothy John Collins, San Francisco, CA (US); Samuel Grossberg, San Francisco, CA (US); Kaylee Slusser, Millsboro, DE (US); Nai Wen Hsu, Richmond, CA (US); Simone Parmeggiani, Foster City, CA (US); Willy Huang, San Francisco, CA (US); Baldwin Po Wei Chang, Sunnyvale, CA (US); Juan Felipe Rios Riano, Foster City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 674 days.

(21) Appl. No.: 17/723,354

(22) Filed: Apr. 18, 2022

(65) Prior Publication Data

US 2022/0337543 A1      Oct. 20, 2022

Related U.S. Application Data

(60) Provisional application No. 63/175,981, filed on Apr. 16, 2021.

(51) Int. Cl.
  *H04L 51/52*       (2022.01)
  *H04L 9/40*        (2022.01)
  *H04L 51/04*       (2022.01)

(52) U.S. Cl.
  CPC .............. *H04L 51/52* (2022.05); *H04L 51/04* (2013.01); *H04L 63/102* (2013.01)

(58) Field of Classification Search
  CPC ..... H04L 63/102; H04L 63/104; H04L 51/04; H04L 51/52

(Continued)

(56) References Cited

U.S. PATENT DOCUMENTS 9,734,323 B2 *   8/2017  Banatwala ............ H04L 63/102
11,062,542 B2 *  7/2021  Lundberg ................. G07C 9/27

(Continued)

*Primary Examiner* — Amare F Tabor

(74) *Attorney, Agent, or Firm* — EVERSHEDS SUTHERLAND (US) LLP

(57) ABSTRACT

According to examples, a system for generating and providing organization-bounded spaces for a virtual community of users may include a processor and a memory storing instructions. The processor, when executing the instructions, may cause the system to generate an organization-bounded space; analyze user information to associate a user with the organization-bounded space; enable the user to receive and publish a content item; and implement a security feature for communications associated with an organization-bounded space and/or its associated users. The processor may further (Continued)

determine recommend a group to the user and identify a user representative for the organization-bounded space.

18 Claims, 22 Drawing Sheets

(58) Field of Classification Search
USPC ............................................................. 726/4
See application file for complete search history.

(56) References Cited

U.S. PATENT DOCUMENTS

| | | | | |
|---|---|---|---|---|
| 11,178,088 | B1 * | 11/2021 | Weiss | H04L 51/52 |
| 11,218,490 | B2 * | 1/2022 | Goyal | G06F 21/6218 |
| 11,283,839 | B2 * | 3/2022 | Raphael | H04L 41/145 |
| 11,418,464 | B2 * | 8/2022 | Roy | H04M 15/00 |
| 11,736,485 | B2 * | 8/2023 | Pechenov | G06F 8/30 |
| 12,120,459 | B2 * | 10/2024 | Gal | H04N 7/157 |
| 2020/0213256 | A1 * | 7/2020 | Moyers | H04L 65/61 |
| 2021/0234817 | A1 * | 7/2021 | Dai | H04L 51/08 |

* cited by examiner

SYSTEM
100

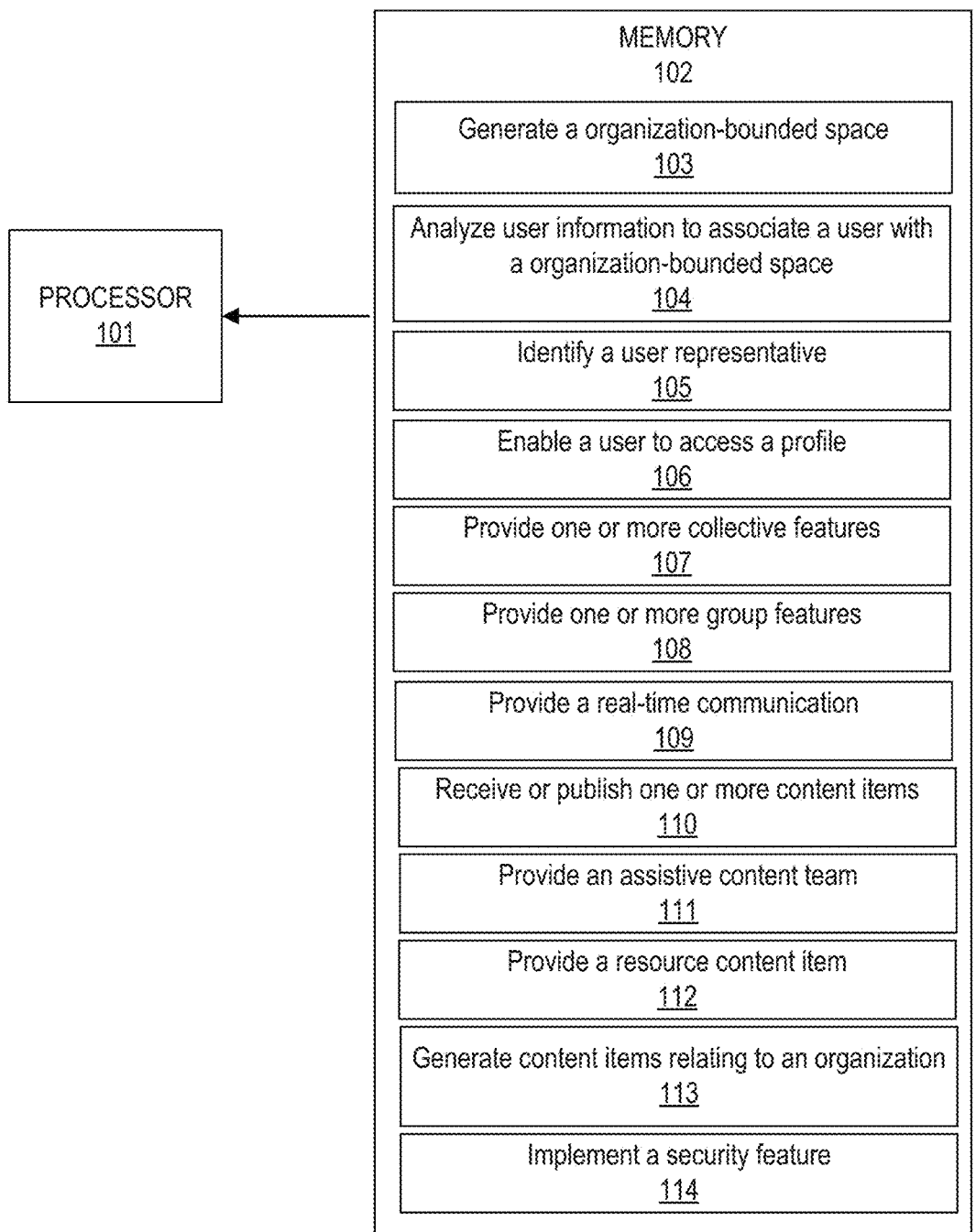

MEMORY
102

Generate a organization-bounded space
103

Analyze user information to associate a user with
a organization-bounded space
104

Identify a user representative
105

Enable a user to access a profile
106

Provide one or more collective features
107

Provide one or more group features
108

Provide a real-time communication
109

Receive or publish one or more content items
110

Provide an assistive content team
111

Provide a resource content item
112

Generate content items relating to an organization
113

Implement a security feature
114

PROCESSOR
101

FIG. 1B

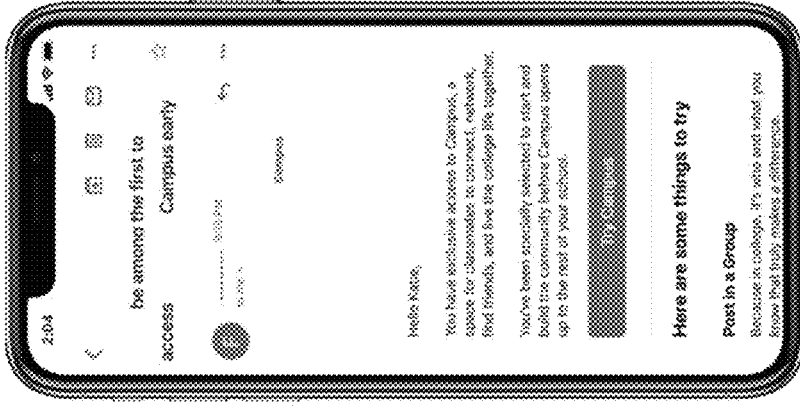
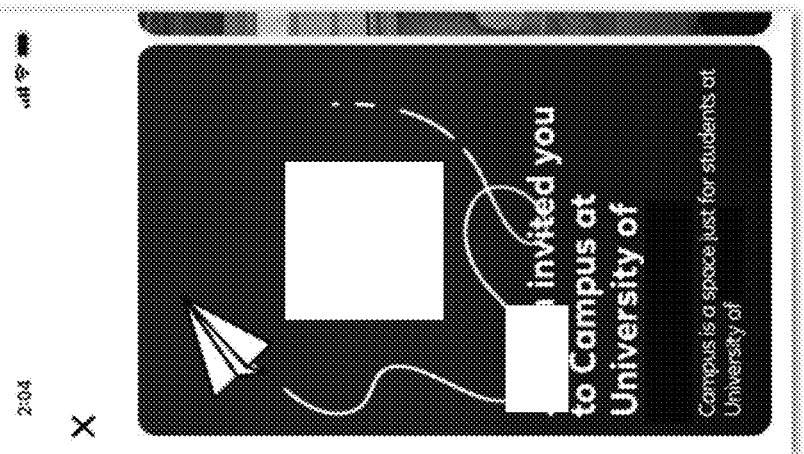
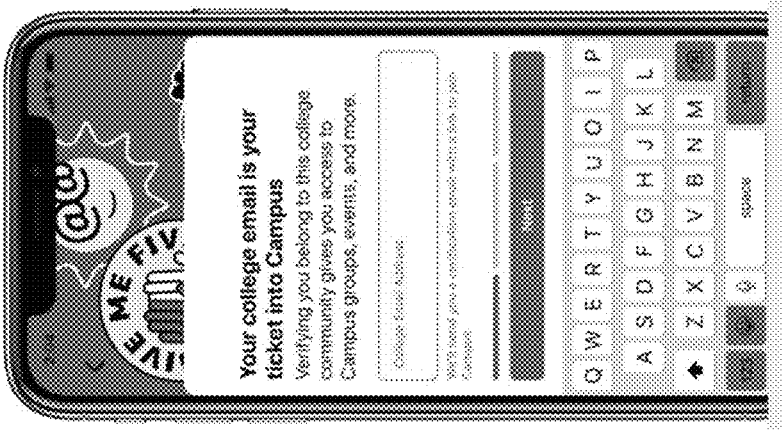
FIG. 1E

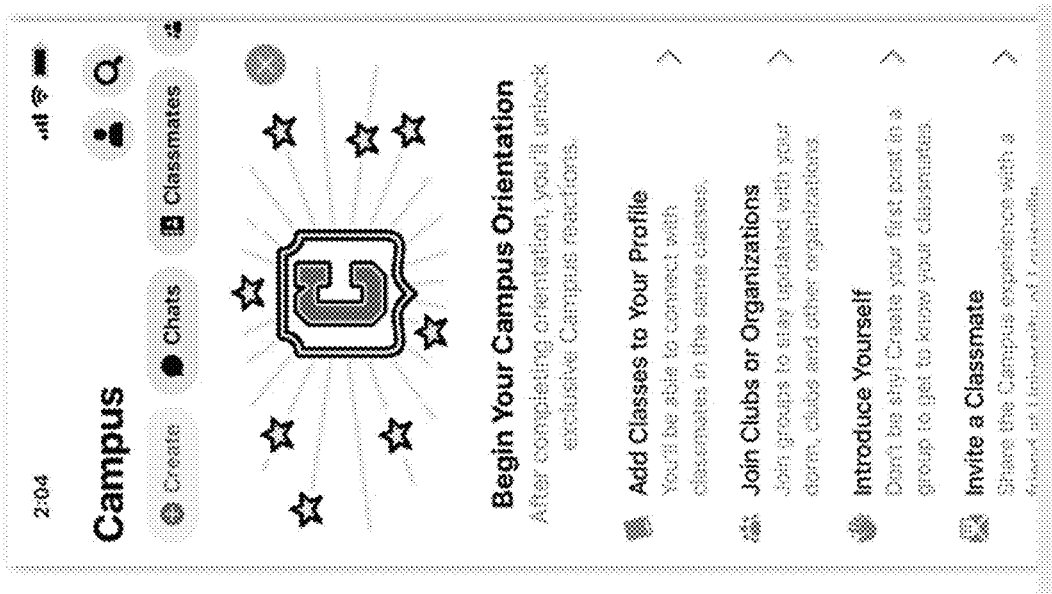
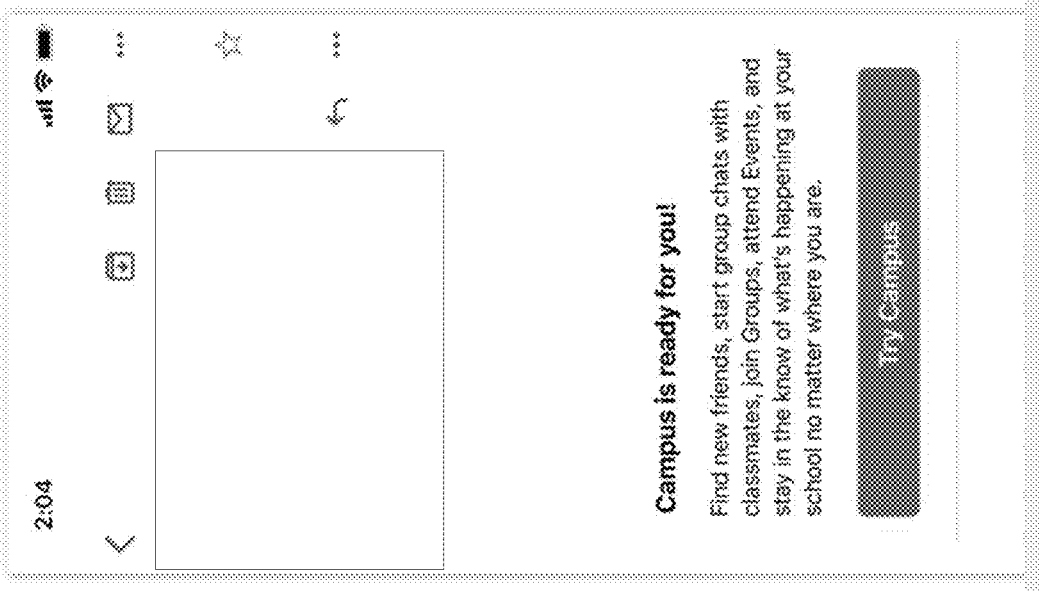
FIG. 1F

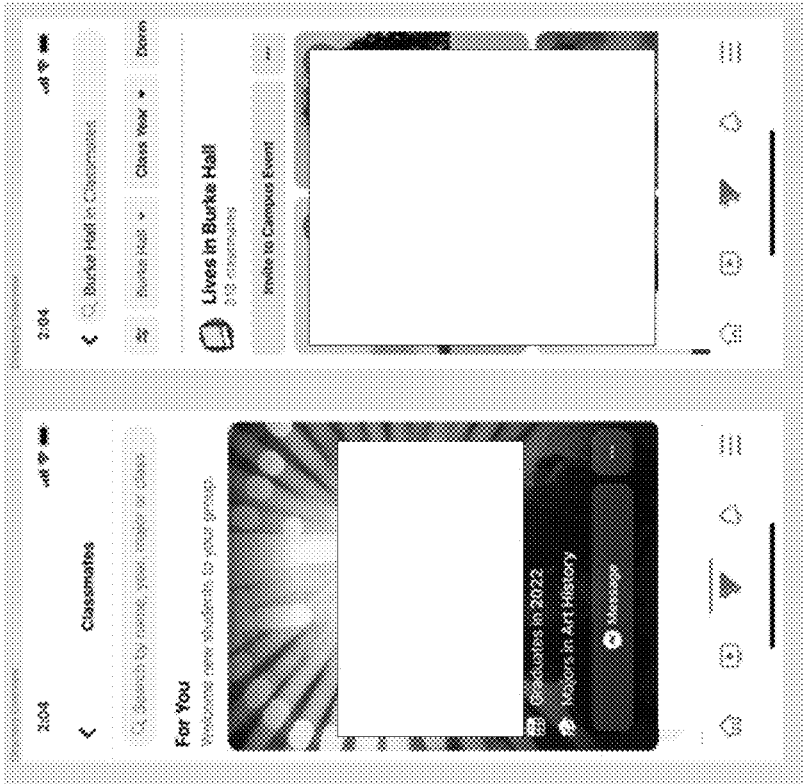
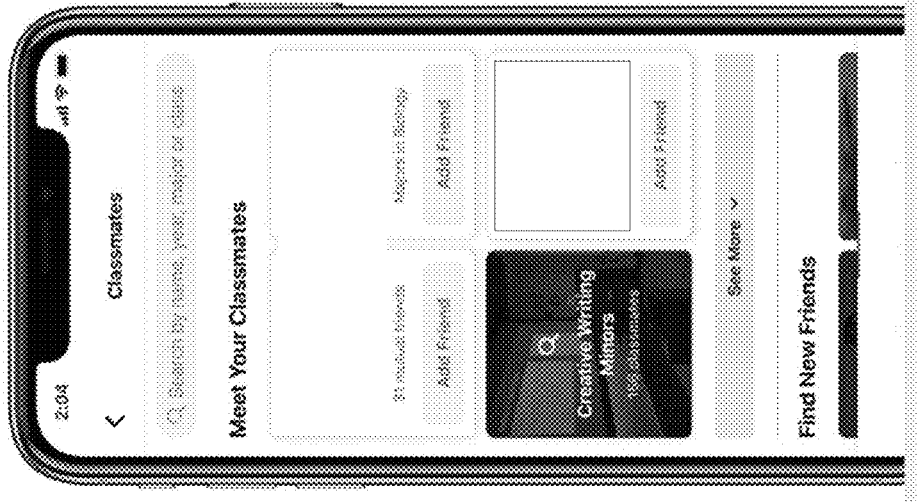
FIG. 1H

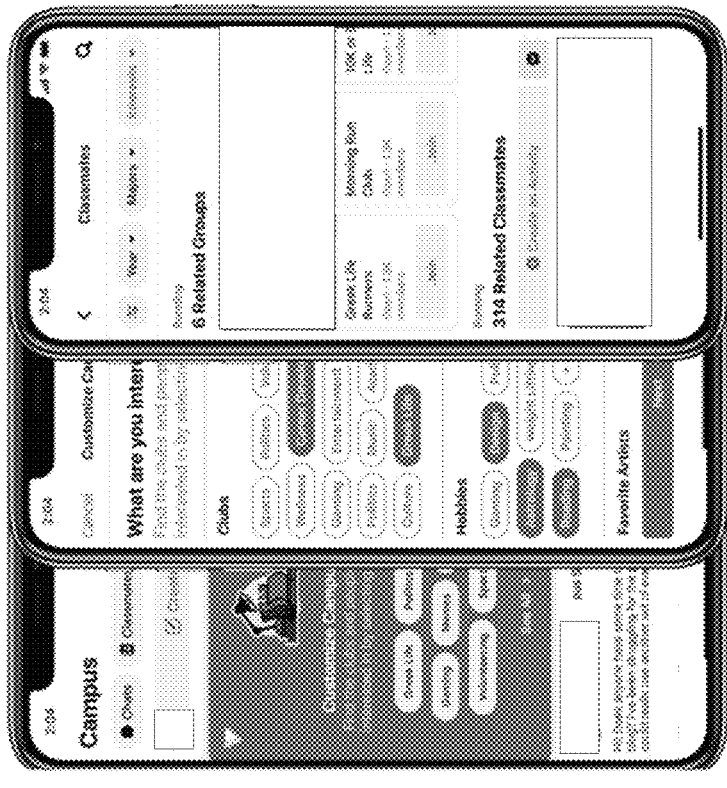
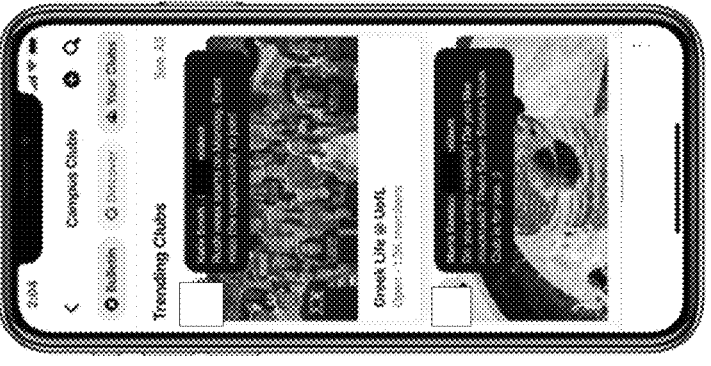
FIG. 1J

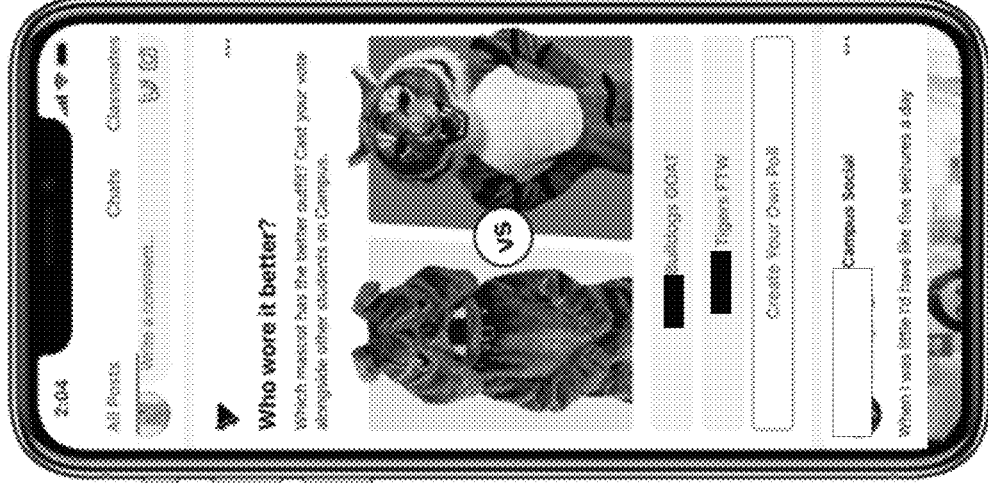
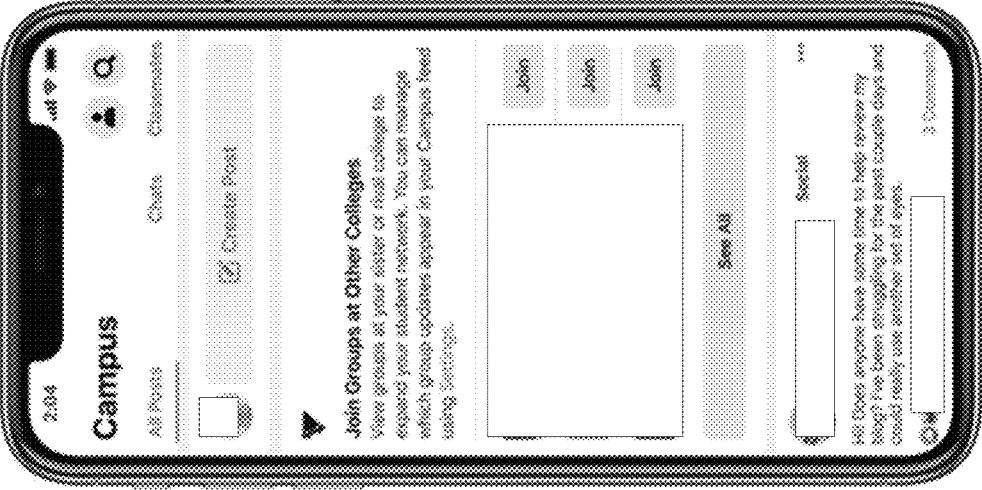
FIG. 1K

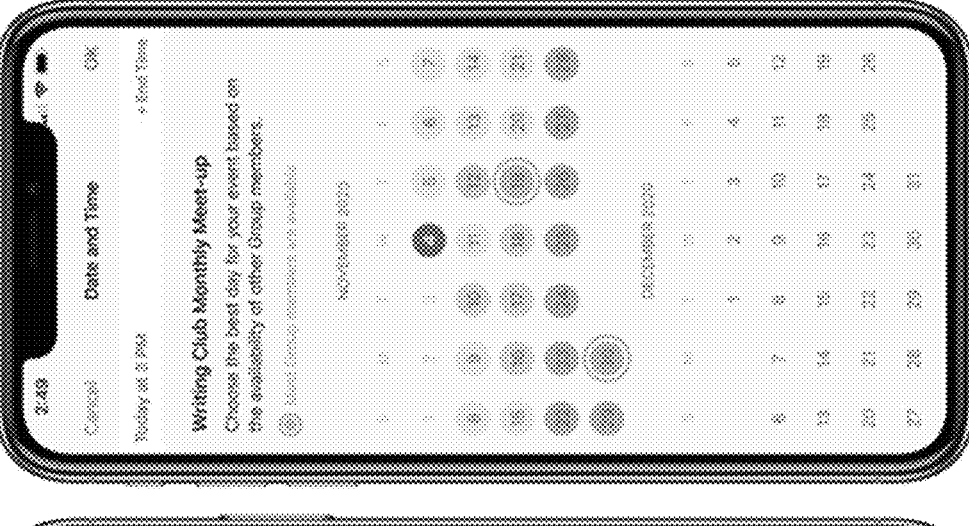
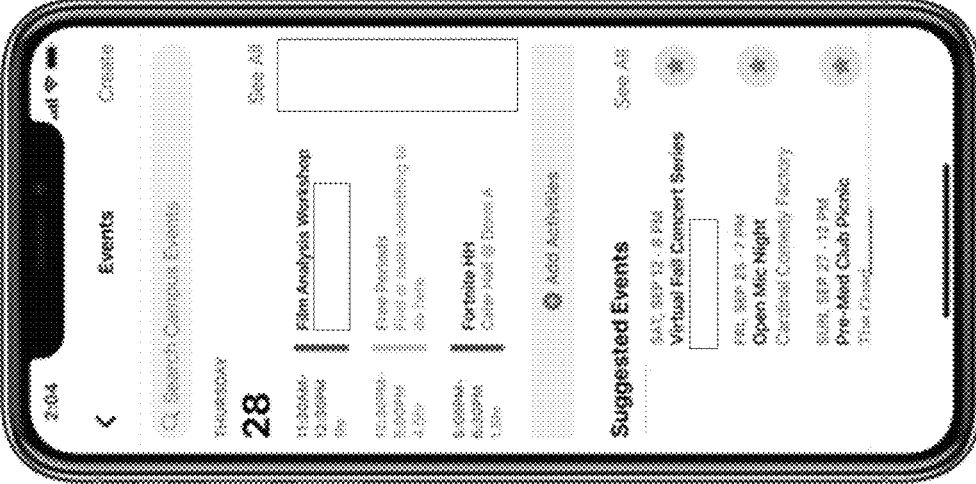
FIG. 1L (cont.)

3000

Generate a organization-bounded space
3100

Analyze user information to associate a user with a organization-bounded space
3200

Identify a user representative for a organization-bounded space
3300

Enable a user to access a profile associated with the user
3400

Enable a user to receive and publish a content item
3500

GENERATING AND PROVIDING ORGANIZATION-BASED SPACES FOR A VIRTUAL COMMUNITY OF USERS

PRIORITY

This patent application claims priority to U.S. Provisional Patent Application No. 63/175,981, entitled "Generating and Providing Exclusive Organization-based Spaces for a Virtual Community of Users," filed on Apr. 16, 2021.

TECHNICAL FIELD

This patent application relates generally to content generation and delivery, and more specifically, to systems and methods for generating and providing organization-bounded virtual spaces associated with a virtual community of users, providing access to content items associated with the organization to the virtual community of users, and enabling the virtual community of users to interact.

BACKGROUND

The prevalence and proliferation of online social platforms has increased rapidly in recent years. These social platforms may, in some cases, enable users located on opposite ends of the world to connect with each other. Accordingly, social platforms have appeared that may be directed to any number of activities, such as friends & family, video sharing, and homestay tourism.

However, while these online social platforms may effectively connect users across great distances, they may not always effectively connect users that may be affiliated with an organization. One example of such an organization may be a university housing students on a campus. In this instance, student users with common associations may be more likely to engage each other on behalf of or with respect to the university. Unfortunately, however, since existing online social platforms may not always be directed to users commonly associated with an organization, such beneficial and cooperative interactions may be lost.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 1B illustrates a block diagram of the system that may be implemented to generate and provide organization-bounded spaces for a virtual community of users, according to an example.

FIG. 1E illustrates a plurality of content items providing sign-in to an organization-based bounded space, according to an example.

FIG. 1F illustrates a plurality of content items offering access to users associated with an organization-bounded space, according to an example.

FIG. 1H illustrates a plurality of content items providing an organization directory, according to an example.

FIG. 1I illustrates a plurality of content items providing an organization bulletin, according to an example.

FIG. 1J illustrates a plurality of content items recommending groups, according to an example.

FIG. 1K illustrates a content item providing communication with external organizations, according to an example.

FIG. 1O illustrates a content item generated via dynamic theming, according to an example.

DETAILED DESCRIPTION

Figure 1A:
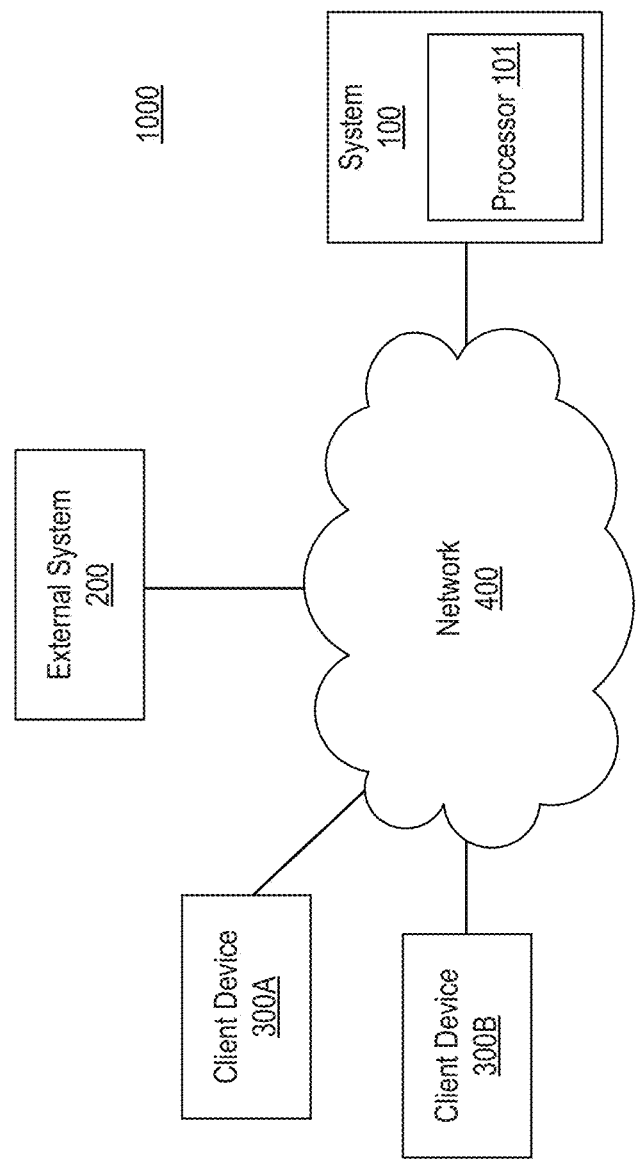
FIG. 1A illustrates a block diagram of a system environment, including a system, that may be implemented to generate and provide organization-bounded spaces for a virtual community of users, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Advances in content management and media distribution are causing users to consume content from a variety of content platforms via user devices. One example of such a content platform may be a social platform. A social platform may typically be provided by a service provider, and content on the social platform may typically be shared by a user to one or more other users of the social platform. As used herein, a "user" may include any user of a computing device or digital content delivery mechanism who receives or interacts with delivered content items, which may be visual, non-visual, or a combination thereof. As used herein, a "user device" may include any device capable of publishing content for a user. Examples may include a mobile phone, a tablet, or a personal computer. Also, as used herein, "publish" may include any manner of making content available for consumption by a user, including but not limited to, "displaying", "playing", "broadcasting", "streaming" or "stream-casting".

As used herein, "digital content", "digital content item" and "content item" may refer to any digital data (e.g., a data file). Examples of digital content items include, but are not limited to, digital images, digital video files, digital audio files, and/or streaming content. Additionally, the terms "digital content item," "content item," and "digital item" may refer interchangeably to the digital content items themselves or portions thereof. Examples of types of content that may be shared over various content platforms may include audio (e.g., podcasts, music), video (e.g., music videos, variety shows, etc.), and text (e.g., micro-blogs, blogs, etc.).

With the proliferation of different types of social platforms, users may connect with other users across the world and engage each other with respect to a variety of activities and interests. Accordingly, social platforms have appeared that may be directed to any number of purposes and/or activities, such as connecting with friends & family, video sharing, eateries and homestay tourism.

However, while these social platforms may each be directed to their own purposes and/or activities, a social platform to connect users that may be commonly associated with an organization may be lacking. Specifically, existing social platforms may not connect users in a manner that may enable connections with other users associated with the organization, in particular over issues and interests that may relate to themselves and/or the organization. As used herein, "organization" may include any entity that may include exclusive plurality of member users. Examples may include universities, community colleges, vocational schools, and primary and secondary schools. While examples described herein may primarily be directed users associated with institutes of learning, it should be appreciated that these example may be directed to other entities as well, such as large corporations or governmental entities.

Systems and methods herein may relate to generating and providing exclusive organization-based spaces for a virtual community of users. In some examples, the systems and methods may include generating and providing an organization-bounded space associated with a particular community of users and enabling exclusive interactions for the community of users. In these examples, to generate and provide the organization-bounded space to the user, the systems and methods may utilize various techniques including computer vision, machine learning (ML), and artificial intelligence (AI).

In some examples, as discussed below, the systems and methods may solicit and verify organization-related information from a user in order to verify the user's association with the organization and, upon verification, may provide an interface with which to connect with other users associated with the organization. In addition, the systems and methods may also provide the community of users content items that are associated with the organization that may foster organization-related interactions (e.g., chats) and provide users an enhanced organization-related experience. In some examples, the systems and methods may provide an organization directory to enable users to acquaint themselves with other users associated with the organization, engage in group activities and endeavors, and access user profiles associated with the organization. In addition, the systems and methods described may enable communications between the users and provide users of organization-related information (e.g., events, announcements). The systems and methods as described may also connect users to with each other based on their personal characteristics and interests, provide insights and recommendations based on personal circumstance or needs, and enable users to receive help from other users that may be similarly situated or interested.

FIG. 1A illustrates a block diagram of a system environment, including a system, that may be implemented to generate and provide organization-bounded spaces for a virtual community of users, according to an example. FIG. 1B illustrates a block diagram of the system that may be implemented to generate and provide organization-bounded spaces for a virtual community of users, according to an example.

As will be described in the examples below, one or more of system 100, external system 200, client devices 300A-B and system environment 1000 shown in FIGS. 1A-B may be operated by a service provider to, among other things, generate an exclusive virtual space for a community of users associated with an organization, verify an association between a user and the organization and provide various means of organization-based interaction between the community of users. It should be appreciated that one or more of the system 100, the external system 200, the client devices 300A-B and the system environment 1000 depicted in FIGS. 1A-B may be provided as examples. Thus, one or more of the system 100, the external system 200 the client devices 300A-B and the system environment 1000 may or may not include additional features and some of the features described herein may be removed and/or modified without departing from the scopes of the system 100, the external system 200, the client devices 300A-B and the system environment 1000 outlined herein. Moreover, in some examples, the system 100, the external system 200, and/or the client devices 300A-B may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 1A-B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, the external system 200, the client devices 300A-B or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the client devices 300A-B, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may store information (e.g., user information) that may relate to generating and providing organization-bounded spaces for a virtual community of users.

In some examples, and as will be described in further detail below, the client devices 300A-B may be utilized to, among other things, generate an exclusive virtual space for a community of users associated with an organization, verify an association between a user and the organization and provide various means of interaction between the community of users. So, in one example, the client device 300A may be utilized by a first user (e.g., a university administrator) to generate a content item relating to an associated organization-bounded space on a content platform. Also, in this example, the client device 300B may be utilized by a second user (e.g., a university student) to interact with the content item generated by the first user.

In some examples, the client devices 300A-B may be electronic or computing devices configured to transmit and/or receive data. In this regard, each of the client devices 300A-B may be any device having computer functionality, such as a television, a radio, a smartphone, a tablet, a laptop, a watch, a desktop, a server, or other computing or entertainment device or appliance. In some examples, the client devices 300A-B may be mobile devices that are communicatively coupled to the network 400, and enabled to interact with various network elements over the network 400. In some examples, the client devices 300A-B may execute an application allowing a user of the client devices 300A-B to interact with various network elements on the network 400. Additionally, the client devices 300A-B may execute a browser or application to enable interaction between the client devices 300A-B and the system 100 via the network 400.

The system environment 1000 may also include the network 400. In operation, one or more of the system 100, the external system 200 and the client devices 300A-B may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the client devices 300A-B and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 1A, it should be appreciated that, in some examples, the network 400 may include a plurality of interconnected networks as well.

In some examples, and as will be discussed further below, the system 100 may, among other things, among other things, generate an exclusive virtual space for a community of users associated with an organization, verify an association between a user and the organization and provide various means of organization-based interaction between the community of users. In some examples, the system 100 may be operated by a service provider as part of a content platform (e.g., a social media platform). Details of the system 100 and its operation within the system environment 1000 will be described in more detail below.

As shown in FIGS. 1A-D, the system 100 may include processor 101 and the memory 102. In some examples, the processor 101 may execute the machine-readable instructions stored in the memory 102. It should be appreciated that the processor 101 may be a semiconductor-based micropro-cessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, or the like. The memory 102, which may also be referred to as a computer-readable storage medium, may be a non-transitory machine-readable storage medium, where the term "non-transitory" does not encompass transitory propagating signals. It should be appreciated that the memory 102 depicted in FIG. 1B may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the client devices 300A-B. Moreover, and as described further below, it should be appreciated that the processing performed via the instructions on the memory 102 may or may riot be performed, in part or in total, with the aid of or in addition to processing provided by other devices, including for example, the external system 200 and/or the client devices 300A-B.

In some examples, the memory 102 may store instructions, which when executed by the processor 101, may cause the processor to; generate 103 an organization-bounded space; analyze 104 user information to associate a user with an organization-bounded space; and identify 105 a user representative for an organization-bounded space. In addition, the instructions, when executed by the processor 101, may further cause the processor to enable 106 a user to access a profile; provide 107 one or more collective features; provide 108 one or more group features; provide 109 a real-time communication; receive or publish 110 one or more content items; provide 111 an assistive (i.e., "help") content items; provide 112 a resource content items; generate 113 content items relating to an organization; and implement 114 a security feature.

In some examples, and as discussed further below, the instructions 103-114 on the memory 102 may be executed alone or in combination by the processor 101 to generate and provide an organization-bounded space associated with one or more users of a content platform. In some examples, the instructions 103-114 may be implemented in association with a content platform configured to provide content for users.

Additionally, although not depicted, it should be appreciated that to generate and provide the organization-bounded space associated with the user, instructions 103-114 may be configured to utilize various artificial intelligence (AI) based machine learning (ML) tools. For instance, these AI-based machine learning (ML) tools may be used to generate models that may include a neural network, a generative adversarial network (GAN), a tree-based model, a Bayesian network, a support vector, clustering, a kernel method, a spline, a knowledge graph, or an ensemble of one or more of these and other techniques. It should also be appreciated that the system 100 may provide other types of machine learning (ML) approaches, such as reinforcement learning, feature learning, anomaly detection, etc.

Figure 1C:
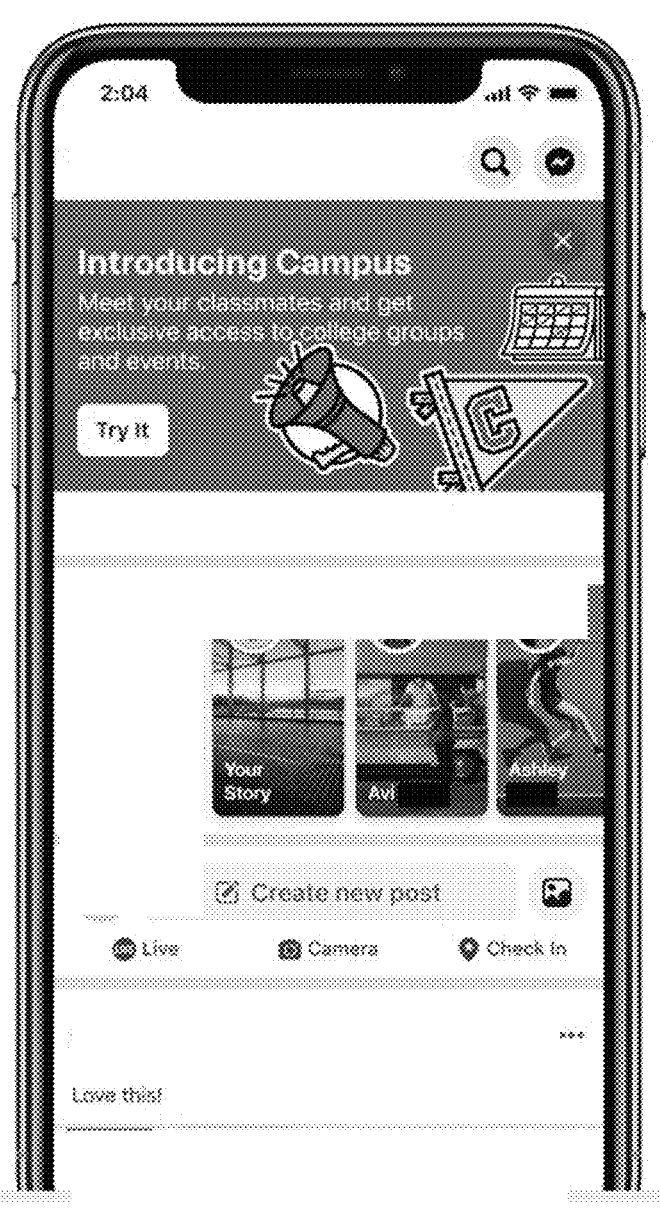
FIG. 1C illustrates a content item introducing an organization-based bounded space, according to an example.

In some examples, the instructions 103 may generate an organization-bounded space. In some examples, the organization-bounded space may be a virtual entity associated with an organization which may facilitate communication between users of a content platform that may be associated with the organization. More specifically, in some examples and as discussed further below, the organization-bounded space may be configured to facilitate communication, participation and exchange between the users associated with the organization. Examples of such organizations may include universities, community colleges, vocational schools and primary and secondary schools. Other examples may include corporations and governmental entities. It should be appreciated that these organizations may or may not be associated with a geographic location. FIG. 1C illustrates a content item introducing an organization-based bounded space, according to an example.

In some examples, to generate an organization-bounded space, the instructions 103 may gather various organization-related information. As used herein, "organization-related information" may include any information that may be associated with determining an organization-bounded space as described. In some examples, organization-related information may include geographic, administrative and incorporation information associated with the organization. So, in one example where the organization may be a governmental entity, the organization-related information may include the governmental entity's name, number of and names of employees and faculty and landmark and location information (e.g., building locations, etc.). In another example where the organization may be a university, the organization-related information may include the university's name, number of and names of students and faculty and associated landmark and location information (e.g., building locations, etc.). In some examples, the instructions 103 may utilize names of the student and faculty to populate the organization-bounded space and verify identities of a virtual community of (new) users.

Figure 1D:
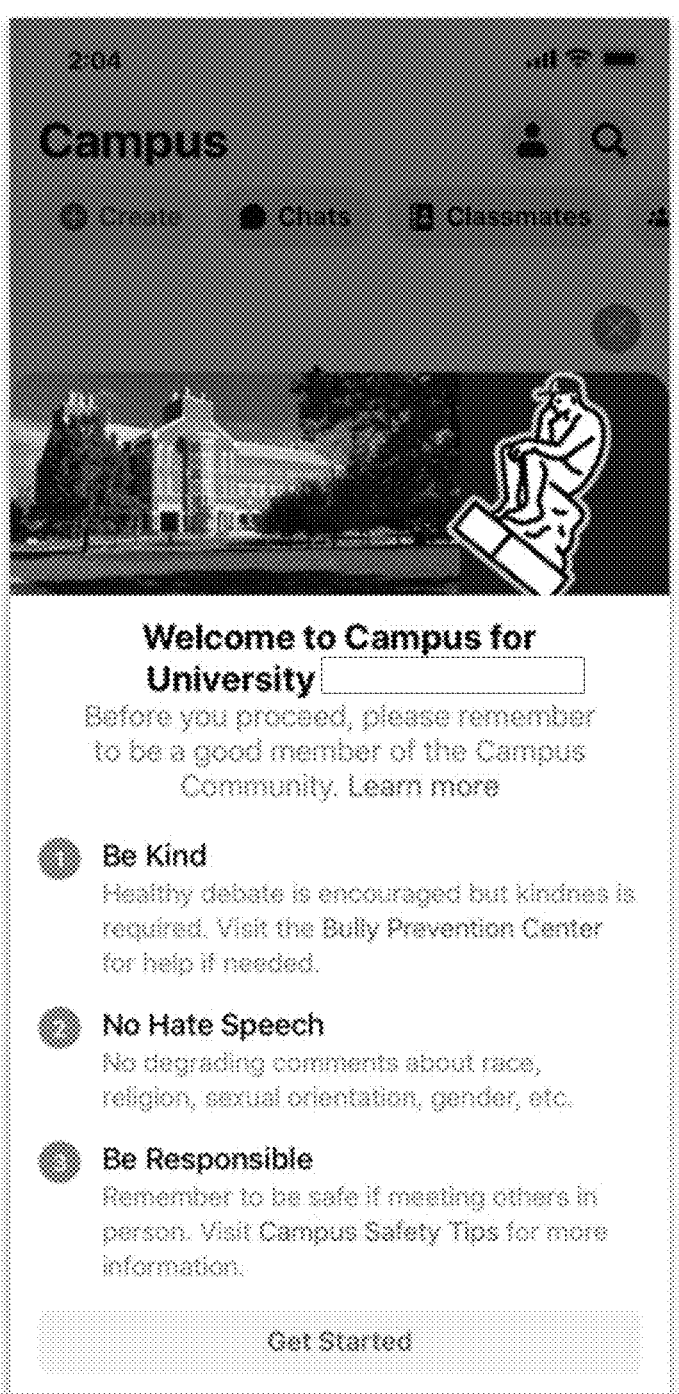
FIG. 1D illustrates an introduction screen introducing an organization-based bounded space, according to an example.

In some examples, in generating an organization-bounded space, the instructions 103 may associate an identifier with an organization-bounded space. It should be appreciated that the instructions 103 may generate and associate one or more identifiers for the organization-bounded space for one or more purposes. So, in one example, the identifier may take the form of a name (e.g., "University of California at Berkeley"). In another example, the identifier may take the form of an identification (ID) number associated with the organization, wherein the ID number may be utilized to identify information (i.e., data) associated with the organization-bounded space in a database storage. FIG. 1D illustrates an introduction screen introducing an organization-based bounded space, according to an example.

In some examples, the instructions 104 may request and analyze user information in order to associate a user with an organization-bounded space. In some examples, to analyze the user information, the instructions 104 may access various information relating to a user. As used herein, the user information may include any information that may be utilized to associate an organization-bounded space with the user.

In some examples, the user information may include an organizational email address. So, in the case of a university, the instructions 104 may be configured to request and receive a university (e.g., ".edu") email address for a user. In some examples, the university email address may be utilized to verify the user's association with the organization-bounded space (i.e., the university) and enable access. In other examples, to associate an organization-bounded space with the user, the instructions 104 may request or verify other user-related information, such as demographic information (e.g., age, gender, etc.) and locational information associated with the user. In some examples, a first user may invite a second user to join an organization-bounded space. FIG. 1E illustrates a plurality of content items relating to sign-in to an organization-based bounded space, according to an example.

In some examples, upon verification, the instructions 104 may associate the user with an organization-bounded space. So, in one example where the user may be a student at the University of California at Berkeley, upon submission of the user's university email address, the student may be associated with an organization-bounded space and a virtual community of users for the University of California at Berkeley. A plurality of examples of a content items offering access as may be provided by the instructions 105 are illustrated in FIG. 1F.

In some examples, the instructions 105 may identify a user representative for an organization-bounded space. As used herein, a "user representative" for the organization-bounded space may include any user that may effect a "role" associated with a content platform (e.g., a social media platform). Examples of user representatives on a content platform may include, but are not limited to, administrator (also "admin"), "leader" and early adopter or "ambassador". In some examples, the user representative may be selected for the role based on the user's ability to further or benefit the content platform's operation. It should be appreciated that, to enable selection of a user representative, the instructions 105 may implement various selection methods and utilize various technologies, including machine-learning (ML) techniques, heuristics (e.g., associated with levels of engagement), and artificial intelligence (AI).

In some examples, the instructions 105 may enable selection of admin for an organization-bounded space. As used herein, an admin may enable generation and curation of content associated with an organization-bounded space on behalf of one or more other users associated with the organization-bounded space. In some examples, to select an admin, the instructions 105 may analyze information relating to a user (e.g., the information gathered via the instructions 103 and 104) and may evaluate the information according to one or more criteria. Examples of criteria that may be utilized to select an admin may include a degree of engagement or activity (e.g., with the target user's content), activity patterns, and demographic criteria (e.g., age, gender, etc.). In some examples, an admin may be prospectively selected from a list of pre-existing admins. Specifically, the list of pre-existing admins may be selected from a list of admins associated with the social communities or groups on a content platform, and may then be further selected based on associated criteria.

In some examples, the instructions 105 may enable selection of "leader" for an organization-bounded space. As used herein, a leader may include users that may have displayed a pre-existing inclination to build a community and/or act towards a community-oriented goal. Examples of criteria that may be utilized to select an admin may include a degree of engagement or activity (e.g., with the target user's content) and activity patterns on a content platform. So, in one example, the selection of admin may be based on a number of events created by the user with more than a threshold number of attendees. Also, in examples where the leader(s) may be selected for a university campus (i.e., the organization-bounded space), the leader(s) may be selected based on (student) government and administrative/information from the university. In these examples, leaders that may be selected may include a student body president, a secretary, a treasurer, a (sports) team captain or a newspaper editor.

In some examples, the instructions 105 may enable selection of an early adopter or "ambassador" for an organization-bounded space. As used herein, an ambassador may be a user likely to be interested in or likely to take an action with respect to an associated organization-bounded space. In some examples, an ambassador may be prospectively selected from a list of pre-existing admins. In addition, in some examples, the instructions 105 may provide an ambassador an ability to generate and receive content associated with an organization-bounded space prior to other associated users. Also, in some examples, a "creative content plan" may be developed and/or implemented with aid of one or more ambassadors in order to create organization-related events.

In some examples, the user representatives may be provided features such as tool kits (e.g., group creation, template posts, etc.), pre-made templates for common posts (e.g., polls), and anonymous posting abilities that may make it easier for user representatives to perform theft roles. In other examples, the instructions 105 may provide "badges" to leaders to indicate their status or content platform funds (i.e., credits) for performing community-oriented activities.

Also, in some examples, the instructions 105 may prospectively select a user representative, upon which the user may be given choice to accept the role or not. In other examples, the instructions 105 may enable a user to "nominate" themselves or another user for a role, upon which the instructions 105 may enable evaluation and designation of the role to the user. Also, it should be appreciated that, in some examples, one or more of these roles may be performed by one user.

In some examples, the instructions 106 may enable a user to access a profile associated with the user. As used herein, a "profile" may be a feature located on a content platform including a collection of information associated with and accessible by a user. In certain examples, the user profile may enable the user to identify themselves on the platform and communicate with other users included in the organization-bounded space associated with the user. In addition, in some examples, the instructions 106 may enable a user to utilize their profile to receive and publish content relating to an associated organization-bounded space.

Figure 1G:
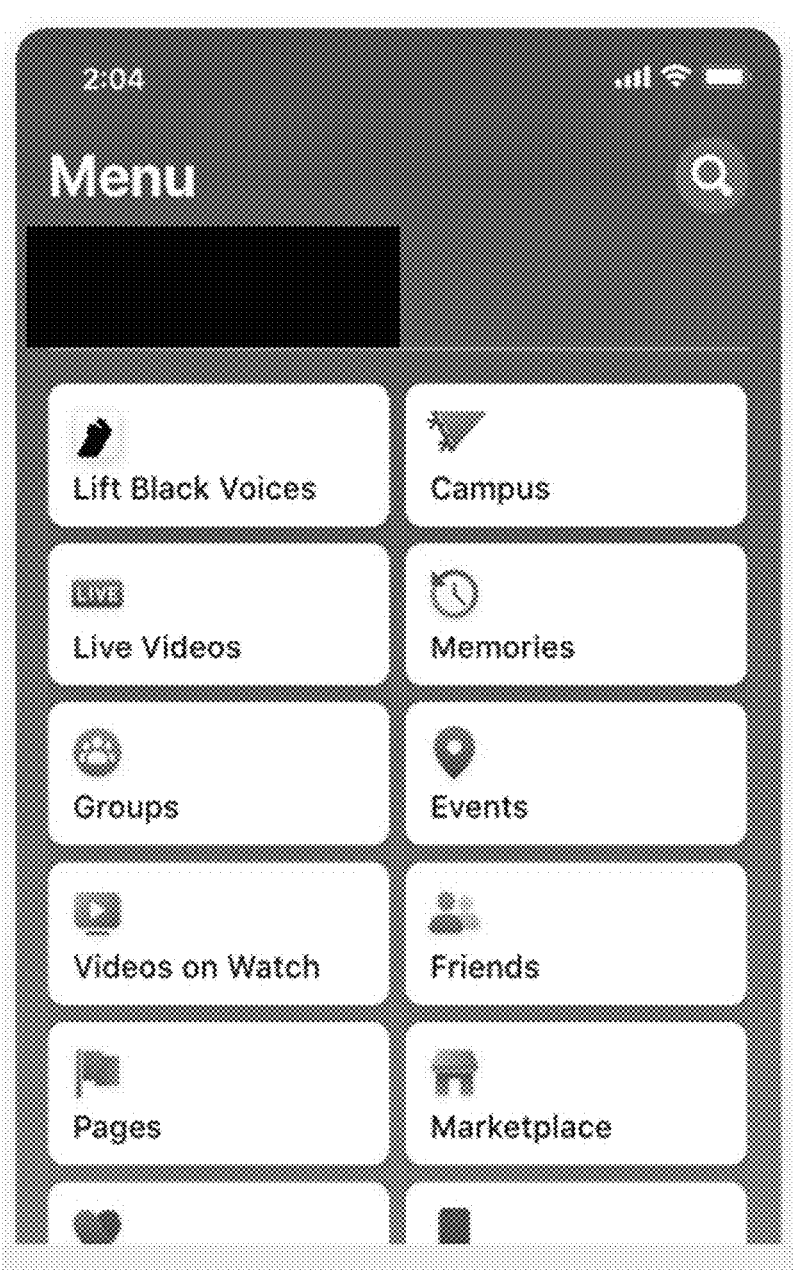
FIG. 1G illustrates a content item providing access to a user profile, according to an example.
Figure 11:
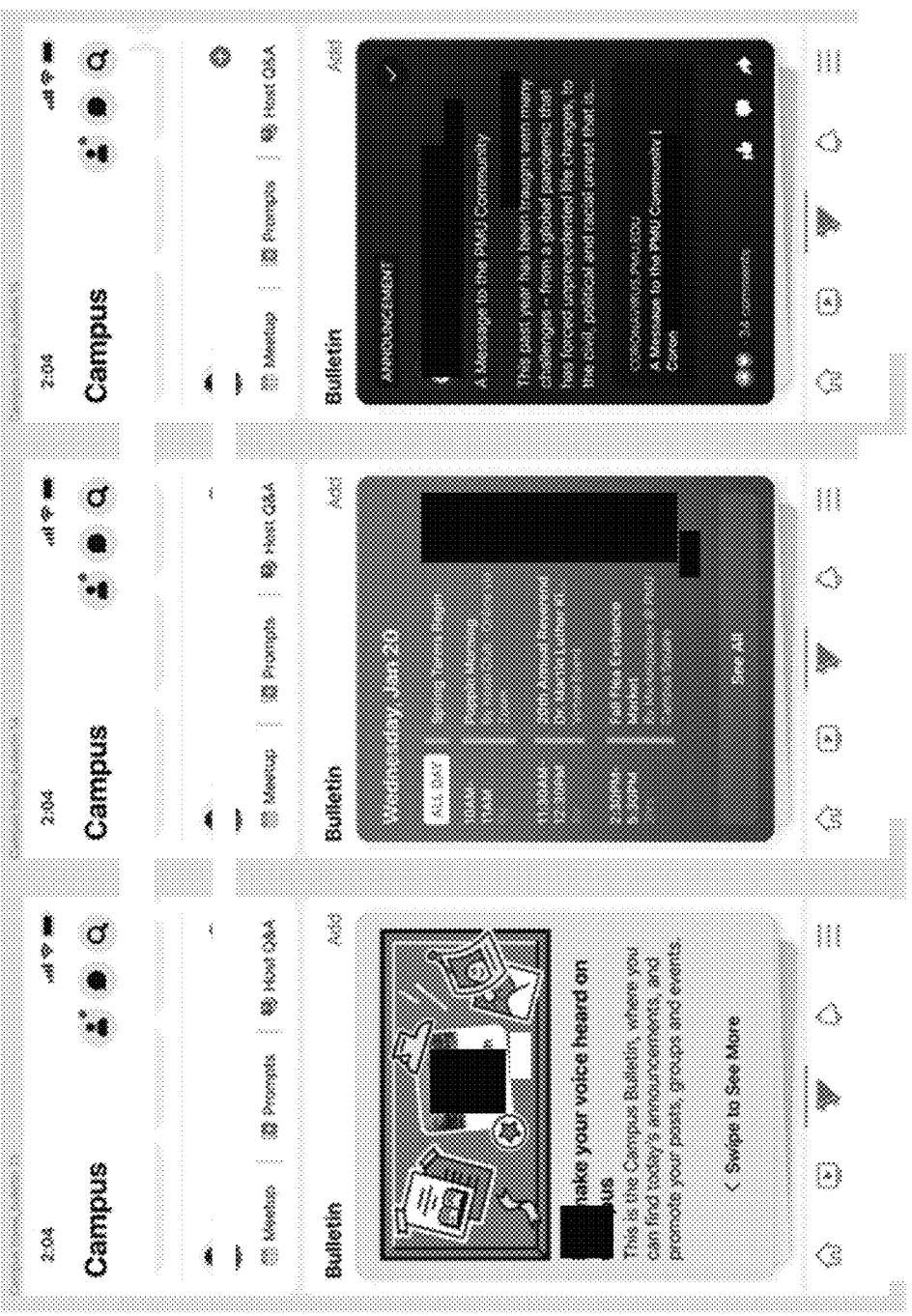

In some examples, the user's profile may be accessed by the user via use of a "tab" made available by the instructions 106. In other examples, the user's profile may be accessed by the user via use of a "bookmark" made available by the instructions 106. In still other examples, the user's profile may be accessed by the user via use of a "menu" made available by the instructions 106. FIG. 1G illustrates a content item providing access to a user profile, according to an example.

In some examples, the instructions 106 may access personal information for the user from a pre-existing store (e.g., the external storage 200) to populate the user's profile. So, in the case of a university campus (i.e., the organization-bounded space), examples of the types of personal information that may be posted may include the student's major(s), minor(s), classes or class schedule and campus residence (e.g., dormitory). As discussed below, this information may be used to group or connect students based on commonalities.

In some examples, the instructions 106 may enable a user to input information (e.g., content) associated with their profile. In some examples, the user may input content (e.g., an image) to personalize their profile and provide personal information for viewing and/or consumption by other users.

In some examples, the instructions may 106 may restrict viewing of the user's profile to those associated with (e.g., included in) the community of users associated with the organization-bounded space. Also, in some examples, the instructions 106 may enable the user to input personal information in order to populate the user's profile. For example, the instructions 106 may prompt the user to provide the user's name, date of birth, and/or an image associated with the user.

Furthermore, in some examples, upon association with an organization-bounded space, the instructions 106 may utilize the user's profile to provide the user with access to information associated with the organization-bounded space. It should be appreciated that the instructions 106 may enable access to information that may relate to any aspect of the organization-bounded space. So, in one example where the organization may be a university, this may include a campus-wide announcement related to safety. In another example, this may include an invitation to campus event.

In some examples, the instructions 107 may provide one or more collective features. As used herein, a collective feature may include any feature that may provide content relating to a plurality of users associated with an organization-bounded space. Examples of collective features may include an organization directory and an organization bulletin.

In some examples, the instructions 107 may provide an organization directory including a listing of users associated with an organization-bounded space. In some examples, the directory may provide insight into fellow members of the organization-bounded space, and may be utilized to familiarize users associated with the organization-bounded space with each other. So, in an example where the organization may be a university, the directory listing may provide a directory of all students (i.e., users) that may be verified members of the organization-bounded space (e.g., via the instructions 104). In some examples, the search results from the directory may return only users affiliated with the organization-bounded space exclusively. Also, in some examples, the instructions 104 may indicate users that may be new additions to the organization-bounded space, such as new (freshmen) students at a university.

In some examples, the directory may be searchable, wherein the user may determine other users that may be affiliated with the organization-bounded space associated with the user. Also, in some examples, the directory may link to user profiles (e.g., via the instructions 106). FIG. 1H illustrates a plurality of content items providing an organization directory, according to an example.

Also, in some examples, results of a directory search by a user may be presented to the user according to personal characteristics (e.g., interests) shared with the user. Accordingly, in some examples, users may be grouped by commonalities in personal characteristics, so that the users associated with the organization-bounded space may see commonalities amongst themselves. So, in an example where the organization may be a university, the directory listing may group students across various aspects available on their profile, including housing/dormitory, major & minor, class year, hometown and individual classes. Indeed, in one example, a freshman student that may be a biology major shown other freshmen biology majors that may be residing in their dormitory building.

Furthermore, in some examples, the instructions 107 may provide a listing of users associated with the organization-bounded space that may be known to a user. So, in examples where the organization may be a university, the instructions 107 may provide to a student utilizing the organization directory other university students that may be known to them. Indeed, in some examples, the instructions 107 may generate and provide a listed ranking of other students that may be known to the student, wherein the instructions 107 may analyze various information relating to the students and other university students (e.g., common friend, hometown, high school attended, etc.) to generate the ranking. It should be appreciated that to generate and provide an organization directory for organization-bounded space, the systems and methods may utilize various techniques including computer vision, machine learning (ML), and artificial intelligence (AI).

In some examples, the instructions 107 may provide an organization bulletin for users associated with an organization-bounded space. In some examples, the organization bulletin may provide a "digest" of various information relating to the organization, and may be provided in the form of a "stack". Examples of the types of information that may be made available by the organization bulletin may include events or news that may pertain to the entire organization.

In some examples, a user may be able to swipe through various elements of the bulletin "stack". Examples of the "entries" or "cards" in the bulletin stack may include organization events, organization news, organization calendar, and related articles or publications. In some examples, a user may "swipe" though a set of cards from the bulletin stack to see information associated with the organization.

So, in an example where the organization may be a university, the stack entries may relate to campus events (e.g., hosted by students and/or university), academic and event calendars, university-related sporting events, university-related and public safety-related news, and information and articles from a university newspaper and university website. It should be appreciated that, unlike event or news aggregators and recommendation services, the bulletin provided via the instructions 107 may return only information (e.g., news, events, etc.) that may be affiliated with the organization-bounded space exclusively. In some examples, the instructions 107 may provide information from sources related to the organization, while in other examples, the instructions 107 may provide information from external sources as well. In these examples, to generate and provide an organization bulletin as described, the systems and methods may utilize various techniques including computer vision, machine learning (ML), and artificial intelligence (AI). FIG. 1I illustrates a plurality of content items providing an organization bulletin, according to an example.

In some examples, the instructions 108 may provide features relating to a groups (of users) associated with an organization-bounded space. In particular, the instructions 108 may enable a pre-existing group or may enable a plurality of users to form a group. Examples of groups of users may include interest-based groups and social groups. So, in an example where the organization may be a university, the instructions 108 may enable social groups (e.g., fraternities, sororities, etc.), academic groups (e.g., honors students, biology majors graduating in 2023, etc.), and interest-based groups (e.g., intramural sports groups, university sports, etc.). In these examples, to enables these various groups for users, the systems and methods may utilize various techniques including computer vision, machine learning (ML), and artificial intelligence (AI).

In some examples, the instructions 108 may analyze a user's interests to associate the user with one or more groups. To associated the user with one or more groups, the instructions 108 may (among other things), retrieve candidate groups, filter the candidate groups by the user's interests, assign a score to each group and rank accordingly. In some examples, the instructions 108 may enable the users associated with the group to interact exclusively with each other, while in other examples, the instructions 108 may enable the users to interact with external users as well.

In some examples, the instructions 108 may automatically create and suggest groups relating to aspects of a user's experience in an organization. That is, in some examples, the instructions 108 may analyze any and all organization-related information associated with one or more users and provide suggested groups that may enhance the user(s) experience. So, in an example where the organization may be a university, the instructions 108 may analyze information associated with a student user's profile (e.g., via the instructions 106). Examples of groups that may be automatically created for student users may include groups for major/minor (e.g., biology majors, chemistry minors, etc.), graduation year (e.g., class of 2023), themes, use cases, and individual courses (e.g., Chemistry 101). More particularly, in one example where a student may be a biology major, the instructions 108 may automatically invite the user to a biology group.

Indeed, it should be appreciated that the instructions 108 may create groups based on any aspect of an organization. In some examples, as the number of group members may increase and may reach a critical mass, the instructions 108 may provide moderators. As used herein, a "moderator" may enable generation and curation of content associated with an organization-bounded space on behalf of one or more other users associated with the organization-bounded space. As used herein, to "moderate" content may include taking an action or expressing an opinion that may relate to propriety of a content item.

In some examples, the instructions 108 may recommend groups for user to join. In an example where the organization may be a university, the instructions 108 may analyze information associated with a student user's profile (e.g., via the instructions 106) and suggest groups. So, in an example where the organization may be a university, the instructions 108 may analyze information associated with a student user's profile (e.g., via the instructions 106) and suggest existing groups based on, for example, interests or commonalities shared between users (e.g., graduation year, major, classes, etc.). In some examples, the instructions 108 may also recommend groups based on a user's social graph, wherein recommendation may be based on groups that the user's social circle may be a part of (e.g., Hey! Your friend Alex is in this group! Want to join?"). FIG. 1J illustrates a plurality of content items recommending groups, according to an example.

In some examples, the instructions 108 may provide a "club fair" for users in order to sample groups available to join. As used herein, a "club fair" may include a presentation of one or more groups that a user may be interested in joining. In an example where the organization may be a university, the instructions 108 may suggest one or more campus groups that a student user may join.

In some examples, to populate the suggested groups in a club fair, the instructions 108 may analyze various information associated with the user to determine suggested groups. Examples of the types of information that may be analyzed may include the student's interests (e.g., politics, sports), academic focus (e.g., major, minor) and social circles (i.e., groups joined by the user's friends). Accordingly, in some examples, the clubs suggested for a user in a club fair may be unique to the user.

In some examples, the user may be able to gather information about a club in a club fair prior to joining. In one example, the user may be able to ask questions to the existing club members. In another example, the user may be able to preview content from the suggested groups.

In some examples, the instructions 108 may enable communication with groups outside of an associated organization. That is, in some examples, the instructions 108 may enable a user in a group associated with an organization to communicate with another user from another organization. In these examples, the instructions 108 may enable a user affiliated with an organization to select an outside organization with which to interact. So, in an example where the first organization may be a university, the instructions 108 may enable a student user to designate another university to interact with, such as receiving and sending content items. Examples of the types of organizations that the student may want to designate to receive communications from may include "sister" colleges, "rivalry schools" and universities or colleges that the student may be interested in attending (e.g., a community college near the student's home). FIG. 1K illustrates a content item providing communication with external organizations, according to an example.

In some examples, the instructions 108 may provide group-related tools that may enable a user to publish content items associated with their groups. In one example, the instructions 108 may enable a user to link a group account to a personal account. That is, in some examples, a user may enable content from a group account they are associated with to be posted to a personal account. In some examples, the personal account may be affiliated with another content platform. So, in an example where the organization may be a university, the instructions 108 may enable a student to allow content from an associated group to be posted to a personal account.

Figure 1L:
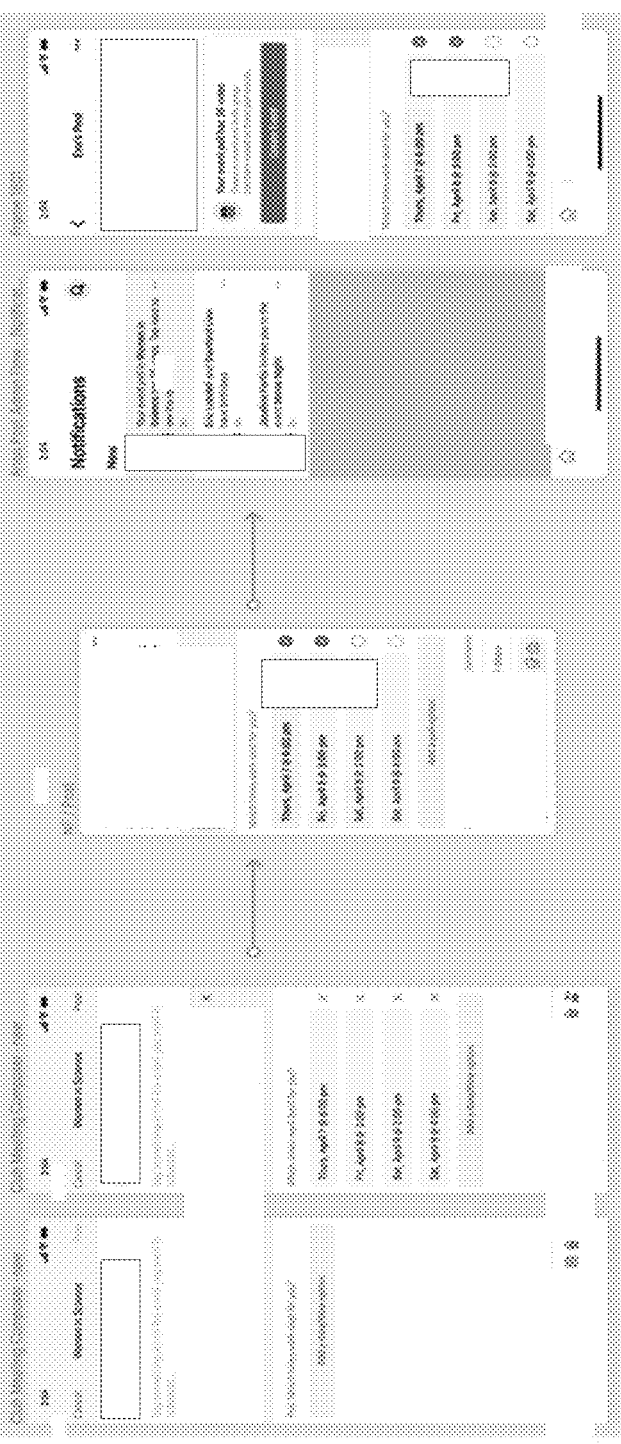
FIG. 1L illustrates a plurality of content items providing group management tools, according to an example.

In other examples, the instructions 108 may provide a group-related tool that may to enable users to coordinate group activities. In particular, in some examples, the instructions 108 may enable a template that may enable group members to efficiently gather information for planning and coordination purposes. So, in some examples, the instructions 108 may enable use of "polls", where group members may be polled relating to time and place to meet. Upon receiving poll results from the group members, the instructions 108 may also convert the results into a scheduled event and automatically invite group members that may have voted for the time and the place to meet. FIG. 1L illustrates a plurality of content items providing group management tools, according to an example.

In some examples, the instructions 109 may generate a content item to facilitate a real-time communication session (e.g., a "chat") between a plurality of users. In some examples, the real-time communication session may relate to an organization-bounded space shared by the plurality of users. It should be appreciated that in some examples, the real-time communication session may be made available to all users associated with the organization-bounded space (i.e., users verified via the instructions 104), while in other examples, the real-time communication session may be made available to a select group of the associated users. Also, in some examples, a user may invite an entire group (e.g., as provided via the instructions 108) to a real-time communication session associated with the organization-bounded space instead of inviting users one by one or by sharing a link to the chat.

Figure 1M:
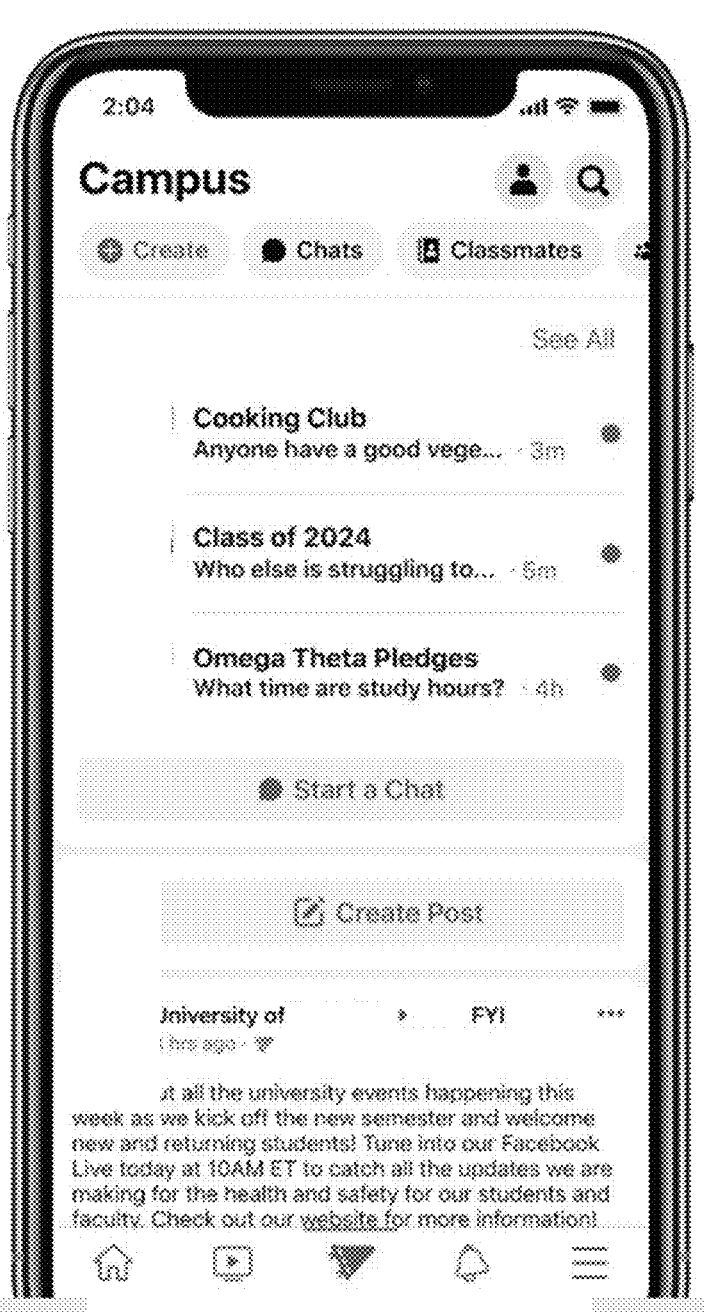
FIG. 1M illustrates a content item including a real-time communication session, according to an example.

In some examples, the instructions 109 may analyze interests of the plurality of users make chats available to each user that may interested. Also, in some examples, the instructions 109 may provide a user one or more existing chats to select from to participate in. It should be appreciated that, in some examples, to generate and provide these real-time communication sessions, the systems and methods may utilize various techniques including computer vision, machine learning (ML), and artificial intelligence (AI). FIG. 1M illustrates a content item providing a real-time communication session, according to an example.

Also, in some examples, the instructions 109 may provide a location-based real-time communication session (e.g., chat) based on a location of one user to another. In particular, in some examples, the instructions 109 may notify a first user associated with an organization-bounded space that a second user associated with the organization-bounded space may be nearby, and may generate an associated chat for the first and the second users. Also, in some examples, the instructions 109 may generate a map indicating locations of ongoing chats. In particular, the instructions 109 may indicate locations of users participating in chats and the chats they are participating in, so that a user may select one of the ongoing chats and participate as well. It should be appreciated that in some examples, the location-based chat(s) may be made limited to users associated with the organization-bounded space (i.e., users verified via the instructions 104).

In some examples, the instructions 110 may enable a user to receive and to publish content items. In some examples, the content items may be associated with the user's organization-bounded space, and may be selected for delivery to the user based on a likelihood of fostering interaction, cooperation and/or participation amongst users associated with the organization-bounded space. It should be appreciated that, in some examples, the content items may be generated and delivered solely via the instructions 110, while in other examples, the content items may be generated and delivered via the instructions 110 and the user associated with the organization-bounded space. Furthermore, in some cases, the instructions 110 may deliver the content items to all users associated with the organization-bounded space, while in other examples, the instructions 110 may deliver the content items to select users associated with the organization-bounded space (e.g., based on user interests). Also, in some examples, the instructions 110 may only enable users to post content items according to certain criteria. One example criteria may be that content items may only be posted by users to a group, and in particular, to a group that the user may be associated with. In the following examples, to generate and provide content items, the systems and methods may utilize various techniques including computer vision, machine learning (ML), and artificial intelligence (AI).

In some examples, to deliver a content item to a user, the instructions 110 may utilize one or more user interface elements (UI) associated with a content platform. In some examples, the content items delivered via the instructions 110 may be accessible by the user via a content "feed". In other examples, the content items delivered via the instructions 110 may be accessible by the user via a content "library" or "watchlist" included in the user's profile. It should be appreciated that the content items delivered via the instructions 110 may, in some cases, only be viewed by users that are verified to have an association with the organization (e.g., via the instructions 104).

Content items generated and/or delivered via the instructions 110 may take various forms. In some examples, the instructions 110 may generate content items via use of augmented reality (AR) "filters". In some examples, augmented reality (AR) filters may include computer-generated effects that may be "layered" over an image. Also, in some examples, the augmented reality (AR) filters utilized by the instructions 110 may be customized for an organization (e.g., a university).

Figure 1N:
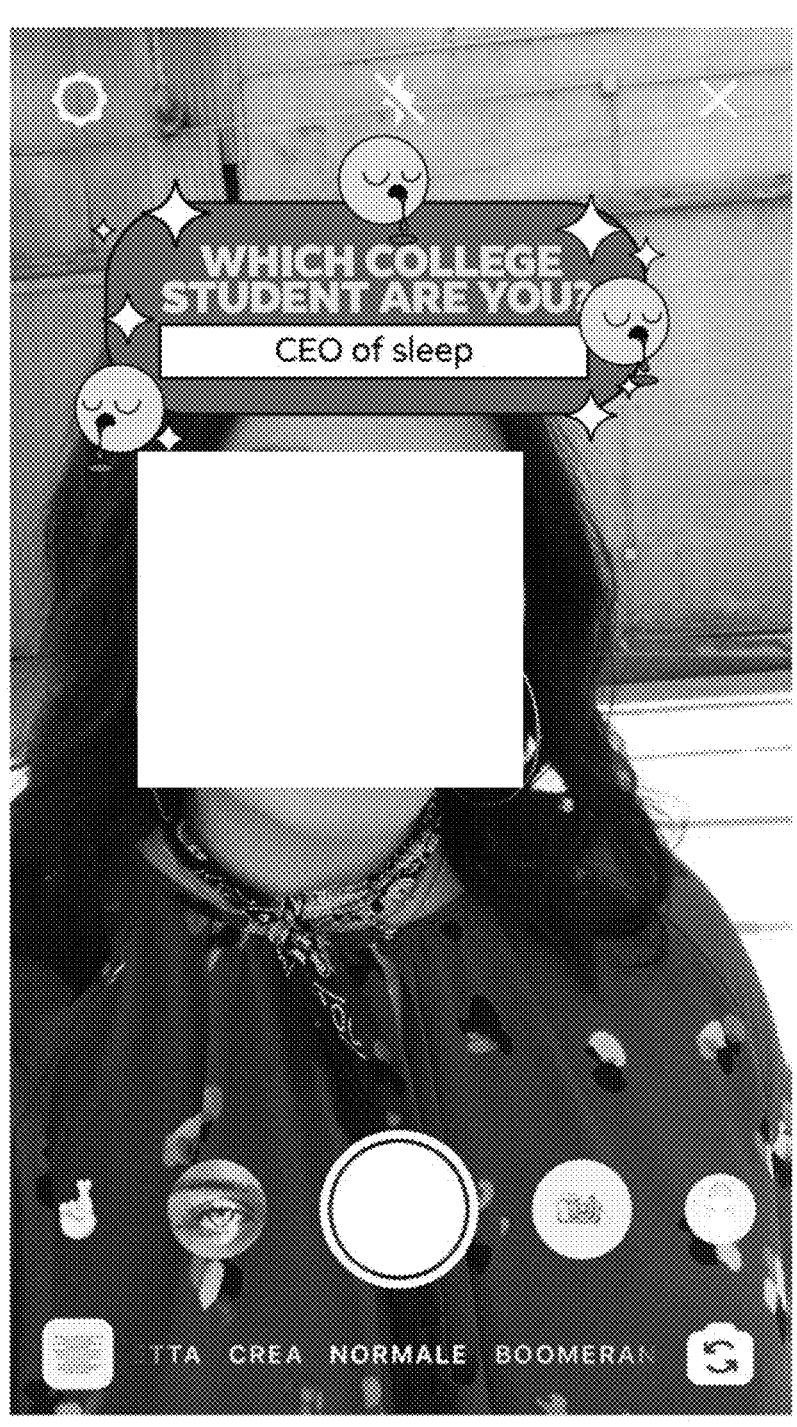
FIG. 1N illustrates a content item generated via use of a template, according to an example.
Figure 10:
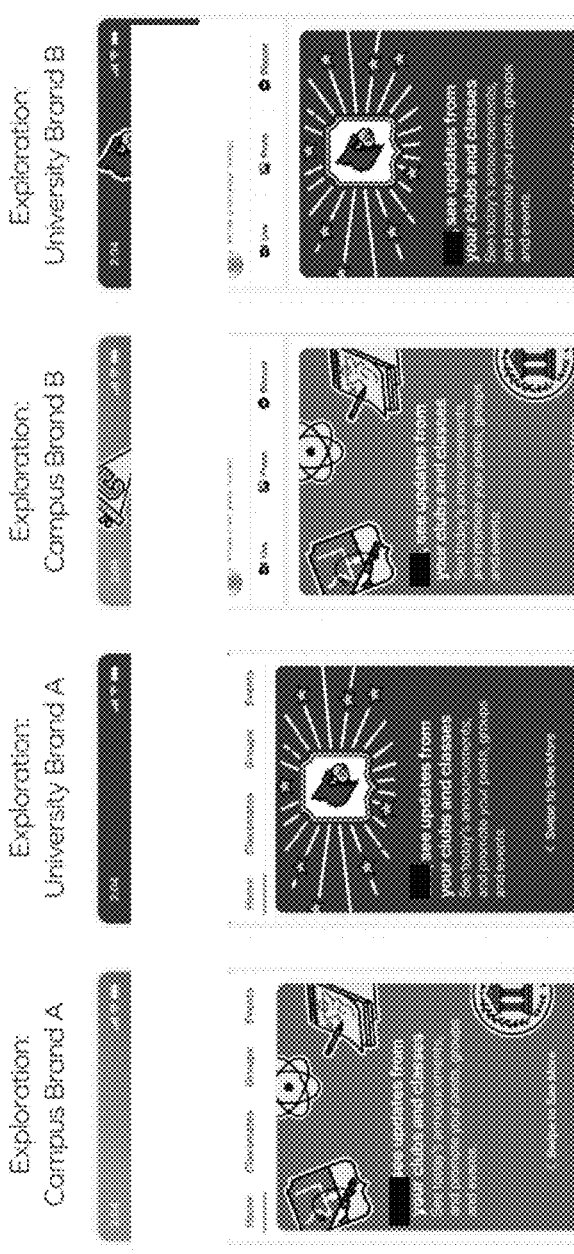

In other examples, the instructions 110 may generate a content item via implementation of one or more content templates. In some examples, content templates may include games (e.g., "madlibs", bingo) that may be directed (solely) to users associated with the organization. In some examples, the content items generated via use of content templates may be utilized (e.g., "played") by users on one or more content platforms. In some examples, the content items may provide ready opportunities for engagement (e.g., "Which college student are you?"). In these examples, to generate and provide content templates, the systems and methods may utilize various techniques including computer vision, machine learning (ML), and artificial intelligence (AI). FIG. 1N illustrates a content item generated using a content template, according to an example.

In some examples, the instructions 110 may enable content items to be "dynamically themed" according to an organization. So, in an example where the organization may be a university, the instructions 110 may enable some content items to be themed according to a university's logo or colors. In other examples, the instructions 110 may enable "reaction" content items (e.g., emojis) and illustrations that may be themed as well. In these examples, to generate and provide dynamic theming by organization, the systems and methods may utilize various techniques including computer vision, machine learning (ML), and artificial intelligence (AI). FIG. 1O illustrates a plurality of content items providing dynamic theming, according to an example.

In some examples, the instructions 110 may enable generation of content items for events that may generally relate to an organization as a whole. In these examples, content items may be generated (e.g., automatically or by direction) to capture the event(s) and may be published to any and all users that may be associated with the organization. In some examples, these content items may be adjusted based on various aspects, such as time of year. So, in an example where the organization may be a university, the instructions 110 may enable content items relating to virtual campus-related events, such as graduation and homecoming, to be published to students that may be associated with the organization-bounded space for the university.

In some examples, the instructions 110 may enable generation of content items by a user relating to activities related to the user's association with an organization. In some examples, the instructions 110 may enable a user to add the generated content item to an existing content platform, such as on a timeline of the user's social media account. So, in an example where the organization may be a university, the instructions 110 may enable a student user to generate content items based on their college events or experiences, such as acceptance, orientation and graduation.

In some examples, the instructions 110 may generate a content item based on information associated with a user. Examples of the types of information that may be associated with the user may include the user's personal characteristics (e.g., interests), browsing history and demographic information. In an example where the organization may be a university, the instructions 110 may generate a content item that may provide information that may be useful to a user, such as class ratings, announcements, etc. In another example, the instructions 110 may generate a content item that may inform a user of an event they may be interested in, such as an event that a friend of the user may be attending. In yet another example, the instructions 110 may generate a content item that that may including a recommendation from a student user, such as a recommendation relating to a local restaurant.

Also, in some examples, the instructions 110 may provide a set of one or more (software) tools to enable a user to publish a content item. In some instances, the set of tools may include for example various editing tools to aid the user in editing images or video that the user may utilize in generating and publishing a content item. In other examples, the set of tools may enable a user to "tag" other users, save drafts of a content item to be published, and provide suggested hashtags for inclusion with/in the content item.

In some examples, the instructions 110 may facilitate an outreach campaign. As used herein, an "outreach campaign" may include delivery of one or more content items to one or more users to notify the user(s) of their respective organization-bounded spaces. In some examples, content items in the outreach campaign may inform users that their fellow users are available in an associated virtual community, and may encourage the users to join as well. So, in a first example where the organization may be a university, the instructions 110 may conduct an email campaign, wherein each user may be notified of their respective organization-bounded space. In a second example, the instructions 110 may generate content platform (i.e., "direct") messages, wherein the user may access the message to be informed regarding the respective organization-bounded space. In these examples, to generate and provide an outreach campaign as described, the systems and methods may utilize various techniques including computer vision, machine learning (ML), and artificial intelligence (AI).

Figure 1P:
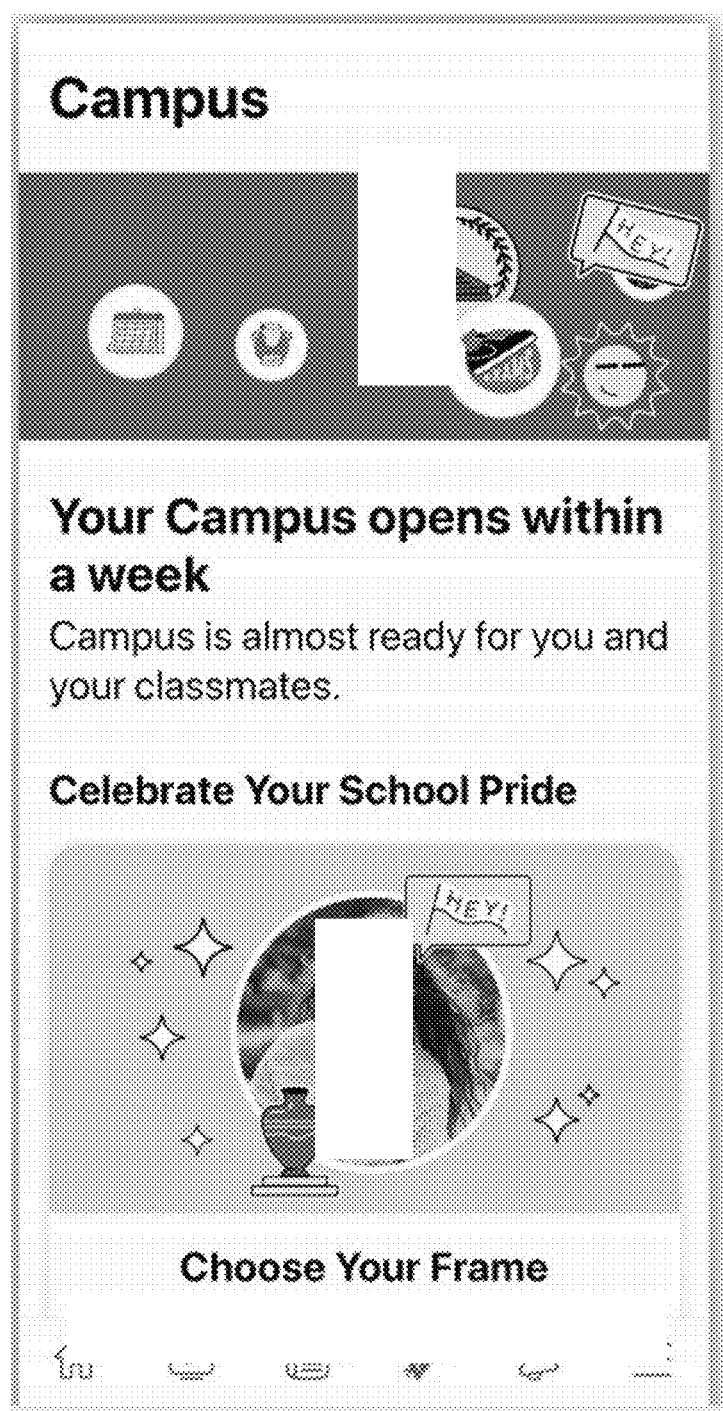
FIG. 1P illustrates a content item providing early access to users, according to an example.

In some examples, the instructions 110 may implement an outreach campaign with one or ore stages (i.e., a "staggered" launch). That is, in some examples, to implement a first stage, in some examples, the instructions 110 may deliver content items to and enable generation of content items by admins and ambassadors (e.g., as determined by the instructions 105), along with university partners and other users likely to be active on a content platform. During this first stage, other users may be provided a "wait screen". FIG. 1P illustrates a content item providing early access to users, according to an example.

In a second stage following the first stage, the instructions 110 may implement a second stage of content delivery that may open the content platform to all users. During the one or more stages, the instructions 110 may generate and deliver to user notifications and promotional user interface (UI) elements, such as reminder messages on a user's profile tab or bookmarks. Also, in some examples, the outreach campaign may be supplemented by incentives to users and by content posted on other content platforms, such as a "launch films" and news articles.

In some examples, the instructions 111 may provide various forms of assistive features. As used herein, an "assistive features" may include content items that may be directed to providing assistance or improving an experience of one or more uses associated with an organization-bounded space. In an example where the organization may be a university, the instructions 111 may publish content items that may be directed to assisting or improve the experience of one or more student users. In these examples, to generate and provide assistive features as described, the systems and methods may utilize various techniques including computer vision, machine learning (ML), and artificial intelligence (AI). Examples of various assistive features are discussed below.

In some examples, the instructions 111 may enable a user to publish a content tern directed to requesting or offering assistance and/or provide support (also referred to as an "assistance item"). It should be appreciated that, in some examples, the assistance item may be accessible exclusively by the users associated with the organization-bounded space. In some examples, the user may provide additional information with the assistance item to categorize or describe the content item. In one example, the additional information may be provided in the form of a "tag". In some examples, the assistance item may be published to an assistance "page" on a content platform that may include one or more content items assistance items published by one or more users associated with the organization-bounded space.

In some examples, the instructions 111 may generate assistance items one or more users that may be related to organizational activities. More specifically, in some examples, the instructions 111 may generate content items that may provide advice or useful information based on an analysis of circumstantial information associated with one or more users. So, in an example where the organization may be a university, the instructions 111 may be directed to providing a student user with information relating to their academic career at the university. In a first example, the instructions 111 may provide a content item that may assist a student user with choosing a major. In this example, the instructions 111 may analyze personal information associated with the user (e.g., from the user's profile), and may utilize various academic-centric tools and utilities, such as calculators (e.g., tuition), to provide recommendations to student users regarding their choice of major. In addition, the instructions 111 may also provide related information that may be helpful, such as an answer to a question like: "What is the value of my degree?"

In some examples, the instructions 111 may provide one or more resources relating to assistance in a situation commonly-faced by users associated with an organization-based space. Examples may include natural disasters or pandemics, where users may be enabled to cooperatively and/or proactively address issues that they or other users may face. So, in an example where the organization may be a university, the instructions 111 may be configured to provide a "page" or "hub" that may enable students to offer to and request assistance from other students. In some examples, the instructions 111 may predict a location for a student and may enable the student to select a radius defining their community and filter offers and requests. In other examples, the instructions 111 may enable a user to select one or more universities (i.e., organizations) to offer help to or request help from. Also, in some examples, the instructions 111 may also direct users to other (e.g., external) modes of communication if desired or optimal.

Figure 1Q:
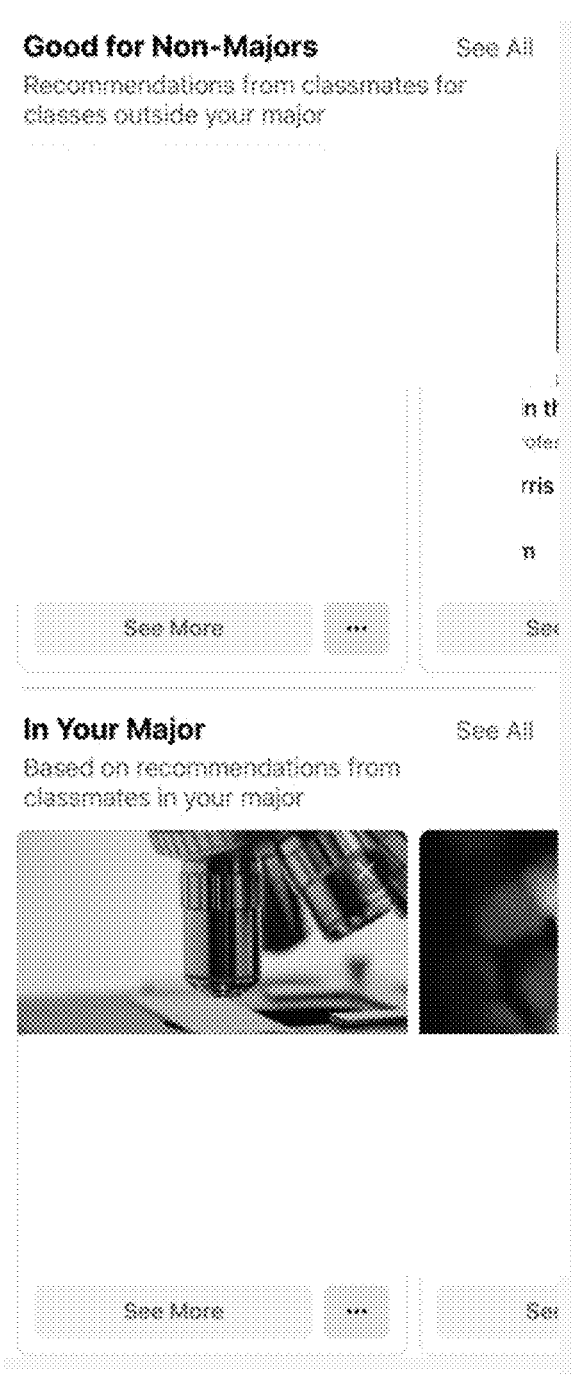
FIG. 1Q illustrates a content item providing a user recommended classes to take, according to an example.

In another such example, the instructions 111 may provide a content item that may recommend classes that a student user may take. In this example, the instructions 111 may be configured to analyze available personal information associated with the student user, such as interests, preferences, (the student user's) major/minor, class ratings (e.g., from similar students), social circle, and graduation requirements, along with information available on the student user's profile. In some examples, the instructions 111 may be configured to employ various criteria to recommend classes. So, in one example where a student may be deciding which classes to register for an upcoming semester, the instructions 111 may provide examples of classes (e.g., elective classes) outside of the student's major that the student may want to take. In other examples, the instructions 111 may determine which classes are likely to be highly-rated by a user in the future, which may be a proxy for classes that the user is likely to succeed at or get value from. In some examples, the instructions 111 may enable a student to add selected classes to a list for later comparison, and "drill down" into each class to see why it was recommended (e.g., class ratings, other students who took the class previously, etc.) and why the class may be a good fit. Also, in some examples, the instructions 111 may connect the user with other users that have taken the class(es) in the past to get personal advice. FIG. 1Q illustrates a content item providing a user recommended classes to take, according to an example.

Figure 1R:
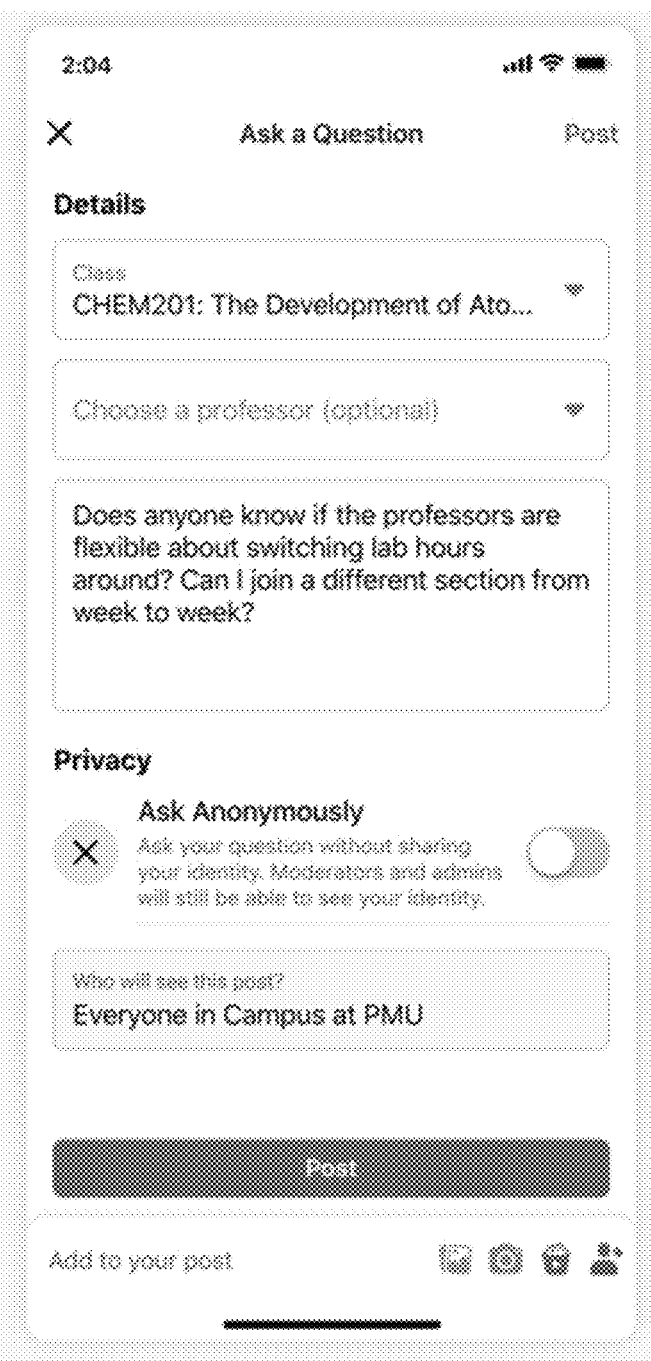
FIG. 1R illustrates a content item providing advice regarding a class by user, according to an example.

In yet another such example, the instructions 111 may provide a content item that represent a "space" on a content platform that may enable students to provide advice or information on how to succeed in a class or with a particular professor. In some examples, the "space" may take the form of a dedicated "page" on the content platform for each class at the university. Also, in some examples, the instructions 111 may provide a repository of past advice or information that (student) users may access as well. FIG. 1R illustrates a content item providing advice regarding a class by user, according to an example.

In addition, in some examples, the instructions 111 may generate content items that may connect a first user and a second user of an organization-bounded space for an organization-related purpose. So, in an example where the organization may be a university, the instructions 111 may be directed to suggesting and connector a first student user with a second student user at the university. In a first example, the instructions 111 may provide a content item that may assist a first student user in finding an activity partner. In one example, the activity partner may be a study partner. In this example, the instructions 111 may be configured to match students based on various available information, such as user profile(s), mutual and past classes, major(s), social graph (e.g., friends) and class ratings. Additional information that may be used to match students may be calendar availability, upcoming milestones (e.g., mid-term exams) or complimentary learning styles.

It should be appreciated that the content item directed to finding an activity partner may take various forms. In one example, the instructions 111 may analyze user information, determine one or more partners, and generate a content item that may suggest a partnership ("You're in 3 classes together, start a study group?"). In another example, the content item may provide an open "space" or "marketplace" where student users may signal interest (in an activity partner) to each other, while in yet another example the content item may match users based on responses to an activity-related questions (i.e., "quiz").

In a second example, the instructions 111 may provide a content item that may assist a first student user in finding a partner/roommate. In this example, the instructions 111 may analyze various available information, such as user profile(s), mutual classes, major(s), major(s) and social graphs (e.g., friends), to recommend that a first user and a second user be roommates.

In some examples, the instructions 112 may generate content items that may direct a user to an available resource. That is, in some examples, the instructions 112 may be directed to suggesting and connecting a user with a resource that may help the user with organization-related activities. In some examples where the organization may be a university, the instructions 112 may connect users with resources that may advance their academic and/or professional careers. In one example, the instructions 112 may analyze any available user information, including a user profile, a social graph (e.g., friends, family, etc.) and class ratings to determine job opportunities (e.g., internships, entry-level jobs) that may be available. In some examples, the instructions 112 may look for job opportunities that may originate from alumni of the university that the user may be attending or from hiring companies that may be affiliated with the university that the user may be attending. It should be appreciated that to generate and provide content items that may direct a user to an available resource, the systems and methods may utilize various techniques including computer vision, machine learning (ML), and artificial intelligence (AI).

In some example, the available resource that the instructions 112 may provide to a user may be a path navigator resource. In some example, the path navigator resource may provide various information, including data, insights and recommendation, that the user may utilize to enhance their organization-related decision-making and planning. So, in an example where the organization may be a university, the instructions 112 may provide a student user with academic and professional career advice that may be based on the user's personal circumstances and goals. In another example, the instructions 112 may utilize other example paths, such as those provided by university alumni, to provide insights and information to a student user. It should be appreciated that to generate and provide content items that may provide path navigator resources, the systems and methods may utilize various techniques including computer vision, machine learning (ML), and artificial intelligence (AI).

In some examples, the available resource that the instructions 112 may direct a user to may be a human resource. In some examples, the human resource may be a mentor. That is, in some examples, the instructions 112 may analyze to determine, for example, an alumni looking to provide mentorship to students attending their alma mater. Also, the instructions 112 may analyze information affiliated with a student user (e.g., major, interests, professional goals, etc.) in order to connect the student user and the mentor.

In some examples, the instructions 113 may generate content items that may relate to organization events. In examples where the organization may be a university, the instructions 113 may publish content items that may be directed to various university activities. It should be appreciated that to generate and provide content items that may relate to organization events, the systems and methods may utilize various techniques including virtual reality (VR), computer vision, machine learning (ML), and artificial intelligence (AI).

In a first example, the instructions 113 may enable users to host or attend (live or asynchronous) virtual gatherings (e.g., classes) that may be made available to students. In this examples, the instructions 113 may be configured to provide various related features, such as scheduling, audience control (i.e., moderation), and recording tools. In addition, the instructions 113 may provide additional features such as "hand raising", audience polls and questions as well.

In a second example, the instructions 113 may enable users to host or attend speeches or addresses. In one such example, a notable alumnus with an engineering degree may deliver an address to student attending an engineering college at the university.

Figure 1S:
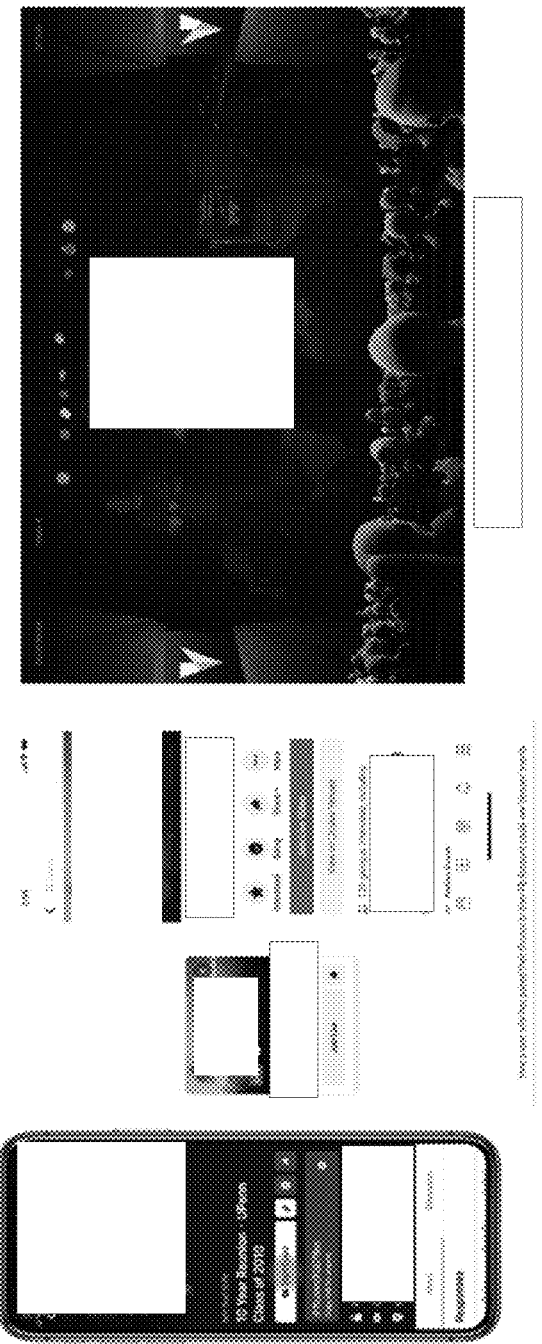
FIG. 1S illustrates a content item providing a virtual class reunion, according to an example.

In a third example, the instructions 113 may generate a content item that may enable users to "attend" a (live or asynchronous) virtual class reunion. In some examples, to publish a virtual organizational (e.g., class) reunion, the content platform publishing the content item may utilize virtual reality (VR) technologies. FIG. 1S illustrates a content item providing a virtual class reunion, according to an example.

In a fourth example, the instructions 113 may provide a media collection of content items relating to organizational activities (e.g., academic classes for students). In some examples, the content items may relate to students graduating in a particular academic year, wherein the content items may include a collection of media items (e.g., "yearbook" photos and videos, etc.) that may be accessed by users associated with the university.

In a fifth example, the instructions 113 may enable various "crowdfunding" events attended by student and alumni users. Examples of the types of crowdfunding events that may be published may include crowdfunding a class gift (e.g., to a charitable cause), crowdfunding an endowed professorship, crowdfunding capital campaigns, crowdfunding athletic-related endeavors (e.g., departments, buildings, etc.), and otherwise generally raising money for causes related to the university community.

In some examples, the instructions 114 may implement a security feature for communications associated with an organization-bounded space and/or its users. In some examples, as described below, the instructions 114 may implement the security features to protect the physical safety of users associated with the organization-bounded space, while in other examples, the instructions 114 may implement the security features to help foster civil and cooperative communications between users. In these examples, to generate and implement a security feature, the systems and methods may utilize various techniques including computer vision, machine learning (ML), and artificial intelligence (AI).

In some examples, the instructions 114 may enable users to share only personal information that they choose. In other examples, the instructions 114 may, upon verification of user information (e.g., ".edu" email address), only be presented with other users that may be verified as being associated with the organization-bounded space of a particular user. In this manner, in some examples, users associated with an organization-bounded space may know that the users made available to them via the instructions 114 are exclusively members of their organization-bounded space.

In some examples, the instructions 114 store (i.e., "log") user actions that may be associated with users of an organization-bounded space. In some examples, the instructions 114 may analyze the logged user actions to determine significant activity or actions, and to determine instances that may require further attention.

Also, in some examples, the instructions 114 may implement bullying and harassment policies, wherein users that may violate said policies may be temporarily or permanently be restricted in their use of the platform. In addition, the instructions 114 may implement bullying classifiers, wherein users may be able to "flag" questionable posts utilizing the bullying classifiers to invite review and removal. In some examples, the instructions 114 may also designate "model" users based on civility displayed in their communications.

Figure 2:
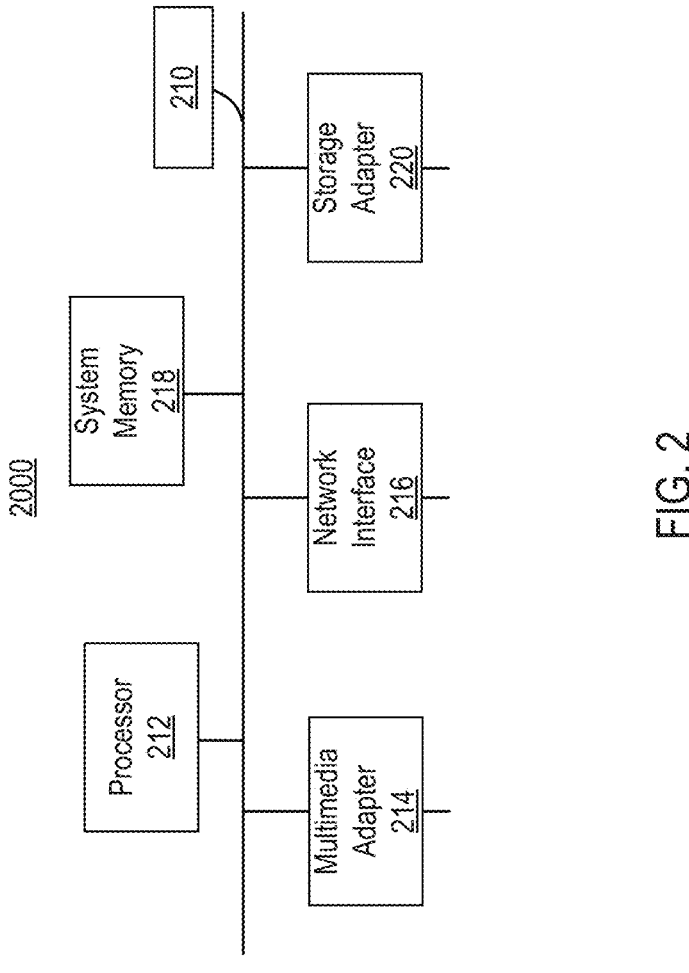
FIG. 2 illustrates a block diagram of a computer system to generate and provide organization-bounded spaces for a virtual community of users, according to an example.

FIG. 2 illustrates a block diagram of a computer system to generate and provide organization-bounded spaces for a virtual community of users, according to an example. In some examples, the computer system 2000 may be associated the system 100 to perform the functions and features described herein. The computer system 2000 may include, among other things, an interconnect 210, a processor 212, a multimedia adapter 214, a network interface 216, a system memory 218, and a storage adapter 220.

The interconnect 210 may interconnect various subsystems, elements, and/or components of the computer system 2000. As shown, the interconnect 210 may be an abstraction that may represent any one or more separate physical buses, point-to-point connections, or both, connected by appropriate bridges, adapters, or controllers. In some examples, the interconnect 210 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 210 may allow data communication between the processor 212 and system memory 218, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 212 may be the central processing unit (CPU) of the computing device and may control overall operation of the computing device. In some examples, the processor 212 may accomplish this by executing software or firmware stored in system memory 218 or other data via the storage adapter 220. The processor 212 may be, or may include, one or more programmable general-purpose or special-purpose microprocessors, digital signal processors (DSPs), programmable controllers, application specific integrated circuits (ASICs), programmablelogic device (PLDs), trust platform modules (TPMs), field-programmable gate arrays (FPGAs), other processing circuits, or a combination of these and other devices.

The multimedia adapter 214 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 216 may provide the computing device with an ability to communicate with a variety of remote devices over a network (e.g., network 400 of FIG. 1A) and may include, for example, an Ethernet adapter, a Fibre Channel adapter, and/or other wired- or wireless-enabled adapter. The network interface 216 may provide a direct or indirect connection from one network element to another, and facilitate communication and between various network elements.

The storage adapter 220 may connect to a standard computer-readable medium for storage and/or retrieval of information, such as a fixed disk drive (internal or external).

Many other devices, components, elements, or subsystems (not shown) may be connected in a similar manner to the interconnect 210 or via a network (e.g., network 400 of FIG. 1A). Conversely, all of the devices shown in FIG. 2 need not be present to practice the present disclosure. The devices and subsystems can be interconnected in different ways from that shown in FIG. 2. Code to implement the dynamic approaches for payment gateway selection and payment transaction processing of the present disclosure may be stored in computer-readable storage media such as one or more of system memory 218 or other storage. Code to implement the dynamic approaches for payment gateway selection and payment transaction processing of the present disclosure may also be received via one or more interfaces and stored in memory. The operating system provided on computer system 2000 may be MS-DOS, MS-WINDOWS, OS/2, OS X, IOS, ANDROID, UNIX, Linux, or another operating system.

Figure 3:
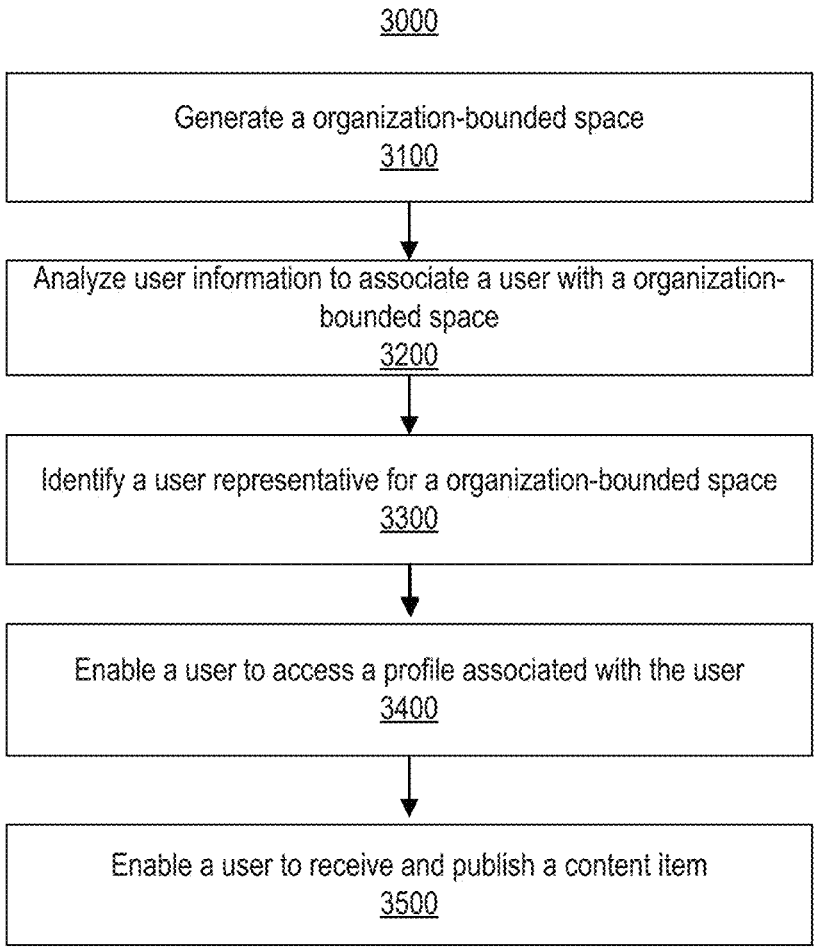
FIG. 3 illustrates a method for generate and provide organization-bounded spaces for a virtual community of users, according to an example.

FIG. 3 illustrates a method 3000 for generating and providing organization-bounded spaces for a virtual community of users, according to an example. The method illustrated in FIG. 3 is provided by way of example, as there may be a variety of ways to carry out the method described herein. Each block shown in FIG. 3 may further represent one or more processes, methods, or subroutines, and one or more of the blocks may include machine-readable instructions stored on a non-transitory computer-readable medium and executed by a processor or other type of processing circuit to perform one or more operations described herein.

Although the method 3000 is primarily described as being performed by system 100 as shown in FIGS. 1A-B, the method 3000 may be executed or otherwise performed by other systems, or a combination of systems. It should be appreciated that, in some examples, the method 300 may be configured to incorporate artificial intelligence (AI) or deep learning techniques, as described above.

At 3100, the processor 101 may generate an organization-bounded space. In some examples, the processor 101 may gather various information, including user information, landmark information, and administrative information of individuals associated that may be associated with the organization-bounded space to be generated. Also, in some examples, the processor 101 may analyze the gathered location information to generate the organization-bounded space and associate an identifier to identify the organization-bounded space.

At 3200, the processor 101 may analyze user information to associate a user with an organization-bounded space. In some examples, to analyze the user information, the processor 101 may access various information relating to the user, including preference information and content-related information.

At 3300, the processor 101 may identify a user representative for an organization-bounded space. In some examples, the processor may enable prospective selection of one or more user representatives to effect the roles of admin, ambassador/early adopter and leader. It should be appreciated that to select user representatives for each role, the processor 101 may utilize associated and respective criteria.

At 3400, the processor 101 may enable a user to access a profile associated with the user. In one example, the user may access the profile by use of a profile "tab" made available by the content platform. In some examples, the processor implements an on-boarding process which may include verifying user information associated with the user, such as an organization (e.g., ".edu") email address. In addition, upon enabling access to the profile, the processor may provide a searchable directory listing of other user associated with the organization-bounded space, which may return results to indicate shared commonalities between users associated with the organization-bounded space.

At 3500, the processor 101 may enable a user to receive and publish a content item (e.g., associated with an organization-bounded space). In some examples, the processor 101 may deliver one or more content items. Furthermore, in some examples, the processor 101 may provide a "page" that may be accessible exclusively by users associated with the organization-bounded space and may include content items relating to the organization-bounded space. Also, in some examples, the processor 101 may implement an outreach campaign that may include a plurality of stages.

By utilizing artificial intelligence (AI) based techniques and mechanisms, systems and methods described herein may generate and provide organization-bounded spaces for a virtual community of users, including generating an organization-bounded space associated with a geographic location, verifying an association between a user and the organization-bounded space, and providing a content item associated with the organization-bounded space to the user. Accordingly, the systems and methods described herein may enable users to connect with other users associated with the organization-bounded space and may provide forms of interactive engagement for users associated with the organization-bounded space that may encourage community-related interactions and strengthen interpersonal ties between the users associated with the community.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 100, the external system 200, and the client devices 300 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 100, the external system 200, and the client devices 300, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100, the external system 200, and the client devices 300, or shared with other systems. Although this disclosure describes using particular privacy settings in a particular manner, this disclosure contemplates using any suitable privacy settings in any suitable manner.

In particular examples, the system 100, the external system 200, and the client devices 300 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100, the external system 200, and the client devices 300 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100, the external system 200, and the client devices 300 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100, the external system 200, and the client devices 300 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100, the external system 200, and the client devices 300 may access such information in order to provide a particular function or service to the first user, without the system 100, the external system 200, and the client devices 300 having access to that information for any other purposes. Before accessing, storing, or using such objects or information, the system 100, the external system 200, and the client devices 300 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 100, the external system 200, and the client devices 300.

In particular examples, a user may specify whether particular types of objects or information associated with the first user may be accessed, stored, or used by the system 100, the external system 200, and the client devices 300. As an example and not by way of limitation, the first user may specify that images sent by the first user through the system 100, the external system 200, and the client devices 300 may not be stored by the system 100, the external system 200, and the client devices 300. As another example and not by way of limitation, a first user may specify that messages sent from the first user to a particular second user may not be stored by the system 100, the external system 200, and the client devices 300. As yet another example and not by way of limitation, a first user may specify that all objects sent via a particular application may be saved by the system 100, the external system 200, and the client devices 300.

In particular examples, privacy settings may allow a first user to specify whether particular objects or information associated with the first user may be accessed from the system 100, the external system 200, and the client devices 300. The privacy settings may allow the first user to opt in or opt out of having objects or information accessed from a particular device (e.g., the phone book on a user's smart phone), from a particular application (e.g., a messaging app), or from a particular system (e.g., an email server). The system 100, the external system 200, and the client devices 300 may provide default privacy settings with respect to each device, system, or application, and/or the first user may be prompted to specify a particular privacy setting for each context. As an example and not by way of limitation, the first user may utilize a location-services feature of the system 100, the external system 200, and the client devices 300 to provide recommendations for restaurants or other places in proximity to the user. The first user's default privacy settings may specify that the system 100, the external system 200, and the client devices 300 may use location information provided from one of the client devices 300 of the first user to provide the location-based services, but that the system 100, the external system 200, and the client devices 300 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100, the external system 200, and the client devices 300 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100, the external system 200, and the client devices 300 may use a user's previous activities and calculated moods, emotions, or sentiments to determine a present mood, emotion, or sentiment. A user who wishes to enable this functionality may indicate in their privacy settings that they opt in to the system 100, the external system 200, and the client devices 300 receiving the inputs necessary to determine the mood, emotion, or sentiment. As an example and not by way of limitation, the system 100, the external system 200, and the client devices 300 may determine that a default privacy setting is to not receive any information necessary for determining mood, emotion, or sentiment until there is an express indication from a user that the system 100, the external system 200, and the client devices 300 may do so. By contrast, if a user does not opt in to the system 100, the external system 200, and the client devices 300 receiving these inputs (or affirmatively opts out of the system 100, the external system 200, and the client devices 300 receiving these inputs), the system 100, the external system 200, and the client devices 300 may be prevented from receiving, collecting, logging, or storing these inputs or any information associated with these inputs. In particular examples, the system 100, the external system 200, and the client devices 300 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100, the external system 200, and the client devices 300 may use the user's mood, emotion, or sentiment to provide newsfeed items, pages, friends, or advertisements to a user. The user may specify in their privacy settings that the system 100, the external system 200, and the client devices 300 may determine the user's mood, emotion, or sentiment. The user may then be asked to provide additional privacy settings to indicate the purposes for which the user's mood, emotion, or sentiment may be used. The user may indicate that the system 100, the external system 200, and the client devices 300 may use his or her mood, emotion, or sentiment to provide newsfeed content and recommend pages, but not for recommending friends or advertisements. The system 100, the external system 200, and the client devices 300 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 100, the external system 200, and the client devices 300 may be restricted in its access, storage, or use of the objects or information. The system 100, the external system 200, and the client devices 300 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100, the external system 200, and the client devices 300 may temporarily store the message in a content data store until the second user has viewed or downloaded the message, at which point the system 100, the external system 200, and the client devices 300 may delete the message from the data store. As another example and not by way of limitation, continuing with the prior example, the message may be stored for a specified period of time (e.g., 2 weeks), after which point the system 100, the external system 200, and the client devices 300 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100, the external system 200, and the client devices 300 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100, the external system 200, and the client devices 300. The user's privacy settings may specify that such information may be used only for particular processes, such as authentication, and further specify that such information may not be shared with any external system or used for other processes or applications associated with the system 100, the external system 200, and the client devices 300. As another example and not by way of limitation, the system 100, the external system 200, and the client devices 300 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., a to authenticate the user, to send voice messages, to improve voice recognition in order to use voice-operated features of the online social network), and further specify that such voice recording may not be shared with any external system or used by other processes or applications associated with the system 100, the external system 200, and the client devices 300. As another example and not by way of limitation, the system 100, the external system 200, and the client devices 300 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 100, the external system 200, and the client devices 300.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100, the external system 200, and the client devices 300 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100, the external system 200, and the client devices 300 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100, the external system 200, and the client devices 300 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100, the external system 200, and the client devices 300 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"), However, if the user changes his or her relationship status, the system 100, the external system 200, and the client devices 300 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100, the external system 200, and the client devices 300 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100, the external system 200, and the client devices 300 may send a reminder to the user to confirm his or her privacy settings every six months or after every ten photo posts. In particular examples, privacy settings may also allow users to control access to the objects or information on a per-request basis. As an example and not by way of limitation, the system 100, the external system 200, and the client devices 300 may notify the user whenever an external system attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:
1. A system, comprising:
a processor;

a memory storing instructions, which when executed by the processor, cause the processor to:

generate an organization-bounded space associated with an organization, the organization-bounded space having an identifier;

analyze user information to associate a first user with the organization-bounded space;

enable the first user to publish a content item associated with the organization-bounded space;

enable the first user to access a first user profile associated with the first user for the organization-bounded space;

restrict viewing of the first user profile to users associated with the organization-bounded space;

present a second user profile associated with a second user within the organization via the organization-bounded space in response to a directory search and based on a shared interest between the first user profile and the second user profile; and provide one or more group features, including automatically creating and suggesting groups based on organization-related information associated with a plurality of user profiles.

2. The system of claim 1, wherein to associate the user with the organization-bounded space, the instructions when executed by the processor further cause the processor to verify the association of the first user with the organization.

3. The system of claim 2, wherein the organization is a learning institution, and wherein verifying the first user's association with the organization further comprises receiving an email address of the first user and determining that the email address is associated with the learning institution.

4. The system of claim 1, wherein the instructions when executed by the processor further cause the processor to identify a user representative for the organization-bounded space.

5. The system of claim 1, wherein to enable the first user to access the first user profile associated with the first user, the instructions when executed by the processor further cause the processor to access personal information associated with the first user from a pre-existing store.

6. The system of claim 1, wherein the instructions when executed by the processor further cause the processor to provide one or more collective features, the one or more collective features including an organization directory including a ranked listing of verified users associated with the organization-bounded space.

7. The system of claim 1, wherein the instructions when executed by the processor further cause the processor to provide one or more collective features, the one or more collective features including an organization bulletin for users associated with the organization bounded space.

8. The system of claim 1, wherein the instructions when executed by the processor further cause the processor to provide a group moderator for the groups upon reaching a critical mass of users for the groups.

9. A method of generating and providing organization-based spaces for a virtual community of users, comprising:

generating an organization-bounded space associated with an organization, the organization-bounded space having an identifier;

analyzing user information to associate a first user with the organization-bounded space;

enabling the first user to publish a content item associated with the organization-bounded space;

enabling the first user to access a first user profile associated with the user for the organization-bounded space;

restricting viewing of the user profile to users associated with the organization-bounded space;

presenting a second user profile associated with a second user within the organization via the organization-bounded space in response to a directory search and based on a shared interest between the first user profile and the second user profile; and providing one or more group features, including automatically creating and suggesting groups based on organization-related information associated with a plurality of user profiles.

10. The method of claim 9, further comprising providing one or more real-time communication features associated with the organization-bounded space based on an interest of the first user.

11. The method of claim 10, wherein the one or more real-time communication features includes a location-based chat.

12. The method of claim 9, wherein enabling the first user to publish the content item includes generating the content item via use of an augmented reality (AR) filter.

13. The method of claim 9, wherein enabling the first user to publish the content item includes implementation of one or more content templates.

14. The method of claim 13, wherein the one or more content templates are dynamically themed according to the organization.

15. A non-transitory computer-readable storage medium having an executable stored thereon, which when executed instructs a processor to:

generate an organization-bounded space associated with an organization, the organization-bounded space having an identifier;

analyze user information to associate a first user with the organization-bounded space;

generate one or more content items associated with the organization;

enable the first user to publish a content item associated with the organization-bounded space;

enable the first user to access a first user profile associated with the first user for the organization-bounded space;

restrict viewing of the first user profile to users associated with the organization-bounded space;

present a second user profile associated with a second user within the organization via the organization-bounded space in response to a directory search and based on a shared interest between the first user profile and the second user profile; and provide one or more group features, including automatically creating and suggesting groups based on organization-related information associated with a plurality of user profiles.

16. The non-transitory computer-readable storage medium of claim 15, wherein the content item associated with the organization-bounded space includes one or more assistive content items to connect the first user and another user associated with the organization-bounded space for an organization-related purpose.

17. The non-transitory computer-readable storage medium of claim 15, wherein the executable when executed further instructs the processor to implement a security feature for communications associated with the organization-bounded space.

18. The non-transitory computer-readable storage medium of claim 15, wherein the executable when executed further instructs the processor to generate the content item via use of an augmented reality (AR) filter.

* * * * *